United States Patent
Wang et al.

(10) Patent No.: US 12,382,282 B2
(45) Date of Patent: Aug. 5, 2025

(54) GROUP CAST WITH RETRIES (GCR) FOR MULTI-LINK OPERATION (MLO)

(71) Applicant: Apple Inc., Cupertino, CA (US)

(72) Inventors: Qi Wang, Sunnyvale, CA (US); Jarkko L. Kneckt, Los Gatos, CA (US); Yong Liu, Campbell, CA (US); Jinjing Jiang, San Jose, CA (US); Yoel Boger, Herzliya (IL); Tianyu Wu, Cupertino, CA (US); Su Khiong Yong, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 530 days.

(21) Appl. No.: 17/721,996

(22) Filed: Apr. 15, 2022

(65) Prior Publication Data
US 2023/0032665 A1    Feb. 2, 2023

Related U.S. Application Data

(60) Provisional application No. 63/224,799, filed on Jul. 22, 2021.

(51) Int. Cl.
*H04L 1/00*    (2006.01)
*H04L 1/1607*  (2023.01)
(Continued)

(52) U.S. Cl.
CPC ......... *H04W 12/041* (2021.01); *H04L 1/1621* (2013.01); *H04L 1/1809* (2013.01); *H04W 12/043* (2021.01); *H04W 12/122* (2021.01); *H04W 28/04* (2013.01); *H04W 28/18* (2013.01); *H04W 48/08* (2013.01); *H04W 48/16* (2013.01);

(Continued)

(58) Field of Classification Search
CPC ... H04L 1/0001–248; H04L 2001/0092–0098; H04W 12/009–80; H04W 28/02–26; H04W 48/02–20; H04W 60/005–06; H04W 72/02–569; H04W 74/002–0891; H04W 76/10–50; H04W 80/02–12; H04W 84/005–22; H04W 88/005–188; H04W 92/02–24
See application file for complete search history.

(56) References Cited

U.S. PATENT DOCUMENTS

2010/0023752 A1* 1/2010 Barker ................ H04W 12/041
2024/0121602 A1* 4/2024 Aio ..................... H04W 12/041

* cited by examiner

*Primary Examiner* — Timothy J Weidner
(74) *Attorney, Agent, or Firm* — STERNE, KESSLER, GOLDSTEIN & FOX P.L.L.C

(57) ABSTRACT

Embodiments are disclosed for group cast with retries (GCR) in a multi-link wireless communications system. In some embodiments, an access point (AP) multi-link device (MLD) can exchange information with a non-AP MLD to establish a GCR-multi-link operation (MLO) agreement corresponding to a group address, wherein the information includes, but is not limited to: a GCR primary link or a GCR primary link set of the AP MLD, an association identifier (AID) that corresponds to the group address. In some embodiments, the AP MLD can transmit a GCR frame subject to the GCR-MLO agreement, where the GCR frame includes a sequence number assigned from sequence number space (SNS)_GCR_MLO defined at a MLD level, and generate a Group Temporal Key (GTK)_GCR_ML at the MLD level, where the GTK_GCR_ML enables encryption and decryption of the GCR frame.

20 Claims, 20 Drawing Sheets

(51) Int. Cl.
  *H04L 1/1809* (2023.01)
  *H04W 12/041* (2021.01)
  *H04W 12/043* (2021.01)
  *H04W 12/122* (2021.01)
  *H04W 28/04* (2009.01)
  *H04W 28/18* (2009.01)
  *H04W 48/08* (2009.01)
  *H04W 48/16* (2009.01)
  *H04W 76/15* (2018.01)
  *H04W 76/40* (2018.01)
  *H04W 84/12* (2009.01)
  *H04W 88/02* (2009.01)
  *H04W 88/08* (2009.01)
  *H04W 92/02* (2009.01)
  *H04W 92/10* (2009.01)

(52) U.S. Cl.
  CPC ........... *H04W 76/15* (2018.02); *H04W 76/40* (2018.02); *H04L 2001/0093* (2013.01); *H04W 84/12* (2013.01); *H04W 88/02* (2013.01); *H04W 88/08* (2013.01); *H04W 92/02* (2013.01); *H04W 92/10* (2013.01)

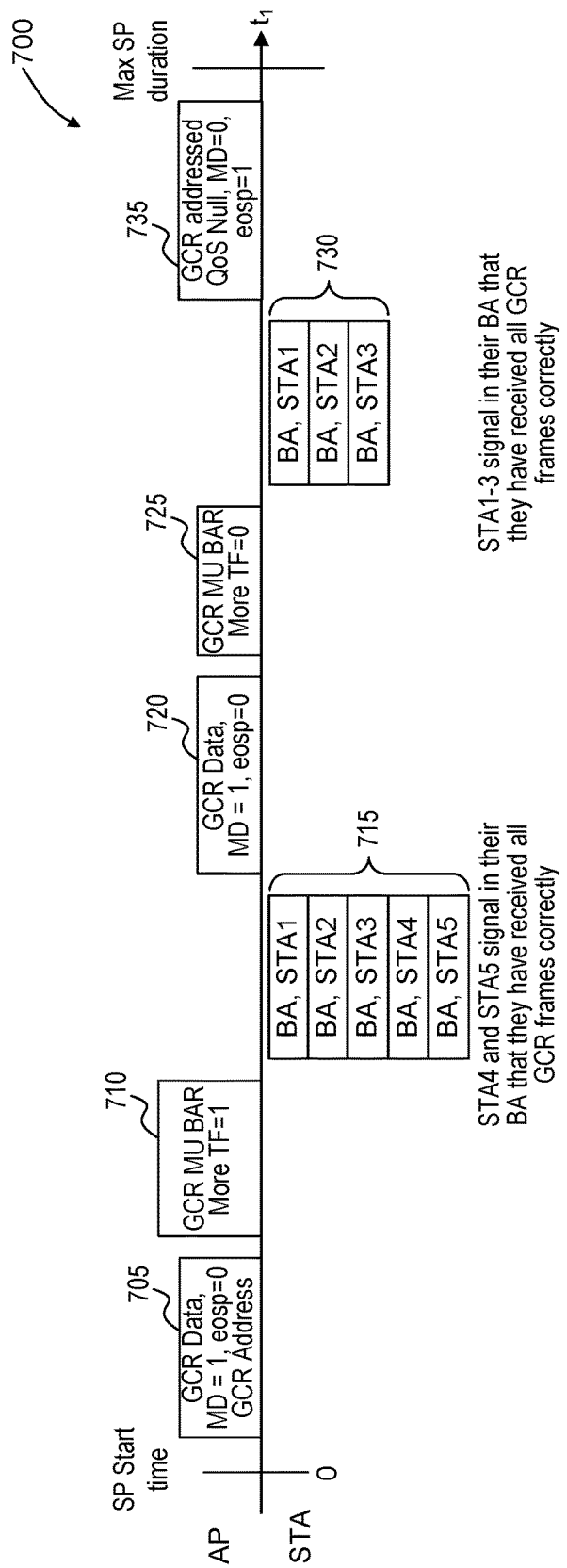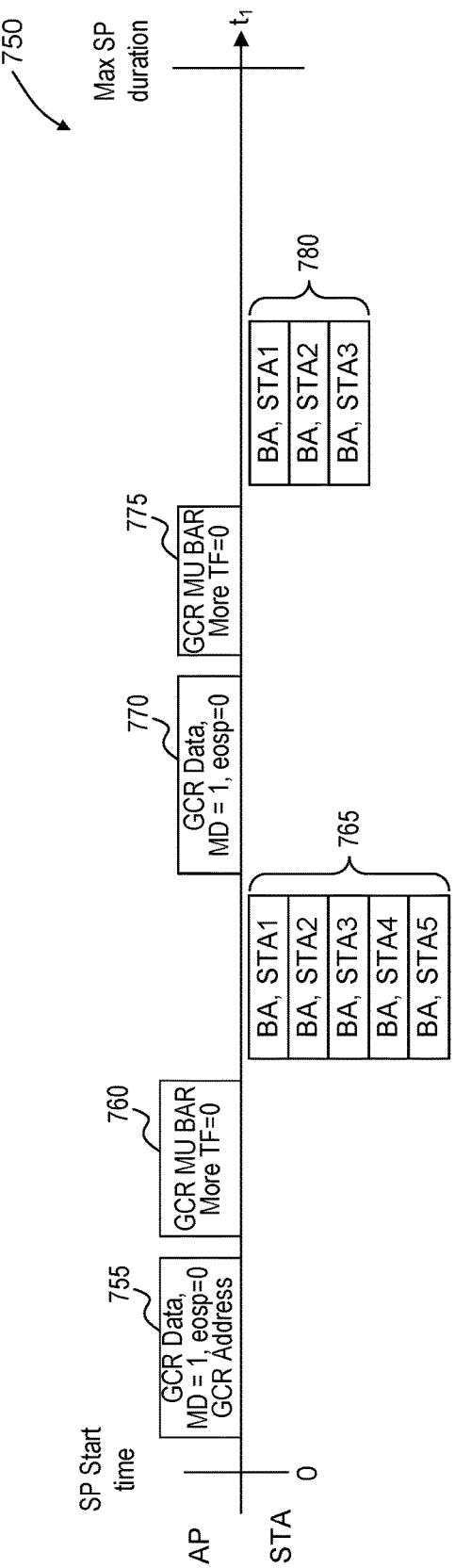

GROUP CAST WITH RETRIES (GCR) FOR MULTI-LINK OPERATION (MLO)

CROSS-REFERENCE TO RELATED APPLICATION

This application claims benefit of U.S. Provisional Patent Application No. 63/224,799, filed on Jul. 22, 2021, which is incorporated herein by reference in its entirety.

BACKGROUND

Field

The embodiments relate generally to wireless devices for transmitting group cast with retries (GCR) in a wireless communication system.

Related Art

Group cast with retries (GCR) is defined in IEEE P802.11REVme_D0.0, Draft Standard for Information technology—Telecommunications and information exchange between systems Local and metropolitan area networks—Specific requirements, Part 11: Wireless LAN Medium Access Control (MAC) and Physical Layer (PHY) Specifications "IEEE P802.11REVme" for single-link operation (SLO) to improve the reliability and/or to reduce the latency of the delivery of group addressed frames.

SUMMARY

Some embodiments include an apparatus, method, and computer program product for group cast with retries (GCR) for multi-link operation (MLO) in a multi-link system such as a Wireless LAN (WLAN) system. Some embodiments include an access point (AP) multi-link device (MLD) that obtains membership of a multicast group (e.g., obtains membership of a group address.) GCR service enables transmission and retransmission of medium access control (MAC) service data units (MSDUs) or aggregate MSDU (A-MSDU) to a destination that is a group address. GCR service increases reliability by enabling retransmissions where the retransmitted group address is concealed from GCR-incapable stations (e.g., legacy GCR-incapable stations.) GCR-MLO enables AP MLD and non-AP MLD to take advantage of multiple links of a MLD for retransmission of group addressed frames while maintaining backward compatibility with legacy devices (e.g., legacy GCR-incapable stations) as well as GCR-capable single link device (SLD) stations.

An AP MLD can establish a group cast with retries (GCR) agreement at the MLD level (e.g., modifying a Direct Multicast Service (DMS) Request/Response frame exchange) used by GCR-single link operation (SLO) to set up a GCR-MLO agreement; or other signaling method to exchange GCR-MLO parameters.) The AP MLD can operate in at least two modes: Mode 1 where all members of a GCR-MLO group are available on a common link, the GCR primary link, during GCR frame delivery time; and mode 2 where all members of a GCR-MLO group are not on available on a common link during GCR frame delivery time. Thus, mode 2 includes a GCR primary link set that includes two or more primary links over which GCR frames can be delivered to members of the GCR-MLO group.

In some embodiments, the AP MLD arranges a GCR-service period (SP) for low latency service where SPs are link specific. For example, the AP MLD can initiate a GCR-SP on a link and terminate the GCR-SP on the link before the scheduled duration of the GCR-SP ends. In addition, SPs (e.g., a target wake time (TWT) SP) can overlap with GCR-SPs. The AP MLD can communicate indications with members of a GCR-MLO group and/or stations corresponding with the overlapping TWT SP to terminate respective SPs individually or in combination with other SPs.

In some embodiments, the AP MLD can define a sequence number space (SNS) for GCR frames at the MLD level for sequence number assignment for GCR frames subjected to an GCR-MLO Unsolicited Retry policy, or GCR frames subjected to an GCR-MLO Block Ack retry policy. The AP MLD can perform duplicate GCR frame detection at the MLD level, and also discard duplicate GCR frames at the MLD level. The AP MLD can generate a group temporal key (GTK) for GCR-MLO at the MLD level for encryption/decryption of GCR frames. In addition, the AP MLD can perform GCR-MLO functions while enabling backward compatibility with: legacy GCR-SLO-capable STAs; GCR-MLO-capable non-AP MLDs; and/or legacy GCR-incapable STAs. When all members of a group address support GCR-MLO, the AP MLD can map one group address to one or more GCR sub-groups.

Some embodiments for GCR-MLO improve link-specific performance by including, but not limited to: assigning associated identifiers (AIDs) for GCR frame transmission; implementing multi-traffic identifier (TID) A-MAC protocol data unit (A-MPDU) aggregated payloads; and managing early termination for link-specific GCR-SPs including GCR-SPs that overlap with other SPs (e.g., TWT SPs).

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIG. 7A illustrates an example of GCR Multi-User (MU) Block Acknowledgement Request (BAR) for early SP termination, according to some embodiments of the disclosure.

FIG. 7B illustrates another example of GCR MU BAR for early SP termination, according to some embodiments of the disclosure.

Figure 1:
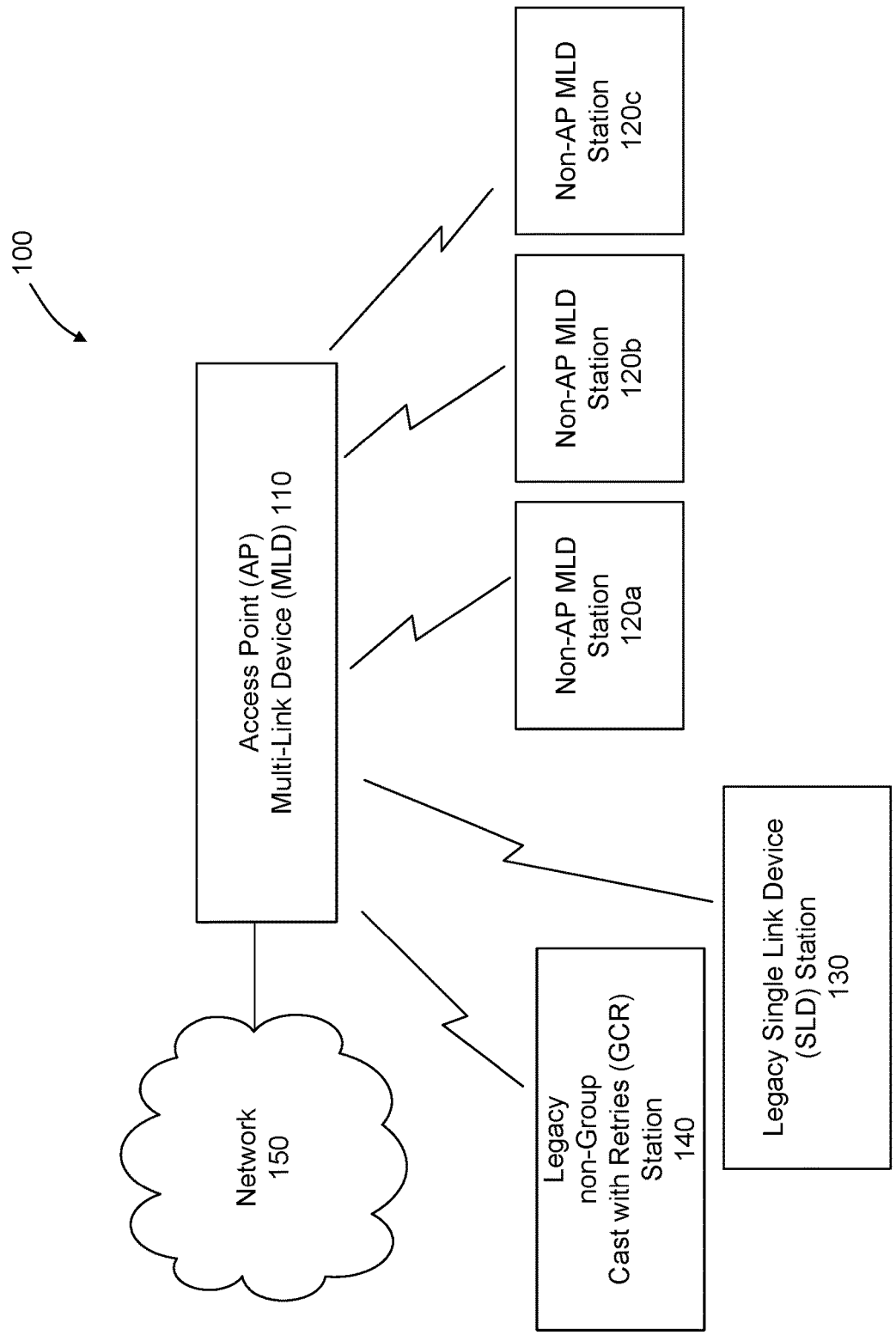
FIG. 1 illustrates an example system for group cast with retries (GCR) for multi-link operation (MLO), in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some multilink devices (MLD) such as an access point (AP) MLD can utilize one or more radios for communications over multiple links to a non-AP MLD station (e.g., an extremely high throughput (EHT) station (STA)). The multiple links can be multiple channels in a same frequency band or multiple channels in different frequency bands. Further, an AP MLD can use a radio of two or more radios to communicate with a legacy station over a link of the multiple links.

FIG. 1 illustrates example system 100 for group cast with retries (GCR) for multi-link operation (MLO), in accordance with some embodiments of the disclosure. System 100 includes AP MLD 110 that provides non-AP MLDs 120a, 120b, 120c, legacy single link device (SLD) station 130, and legacy non-GCR capable station 140 (e.g., not a multi-link device) with access to network 150. Non-AP MLDs 120a-120c, legacy SLD station 130, and legacy non-GCR capable station 140 can be electronic devices that may include but are not limited to a cellular phone, a smart phone, a tablet, a personal digital assistant (PDA), or a laptop. Network 150 may include but is not limited to, any of or any combination of local area networks (LANs), metropolitan area networks (MANs), wireless local area networks (WLANs), and/or the Internet. Non-AP MLDs 120a-120c, legacy SLD station 130, and legacy non-GCR capable station 140 in proximity to AP MLD 110 may associate with AP MLD 110. In some embodiments, AP MLD 110 obtains membership of a multicast group corresponding to a group address. GCR service enables transmission and retransmission of medium access control (MAC) service data units (MSDUs) or aggregate MSDUs (A-MSDUs) to a destination that is the group address. GCR service increases reliability by enabling retransmissions where the retransmitted group address is concealed from GCR-incapable stations (e.g., legacy non-GCR capable station 140.) In some embodiments, AP MLD 110 and non-AP MLD stations 120a-120c can perform GCR-MLO to take advantage of multiple links of a MLD for retransmission of group addresses while maintaining backward compatibility with legacy devices (e.g., legacy non-GCR capable station 140) as well as GCR-capable SLD stations (e.g., legacy SLD station 130.)

Figure 2:
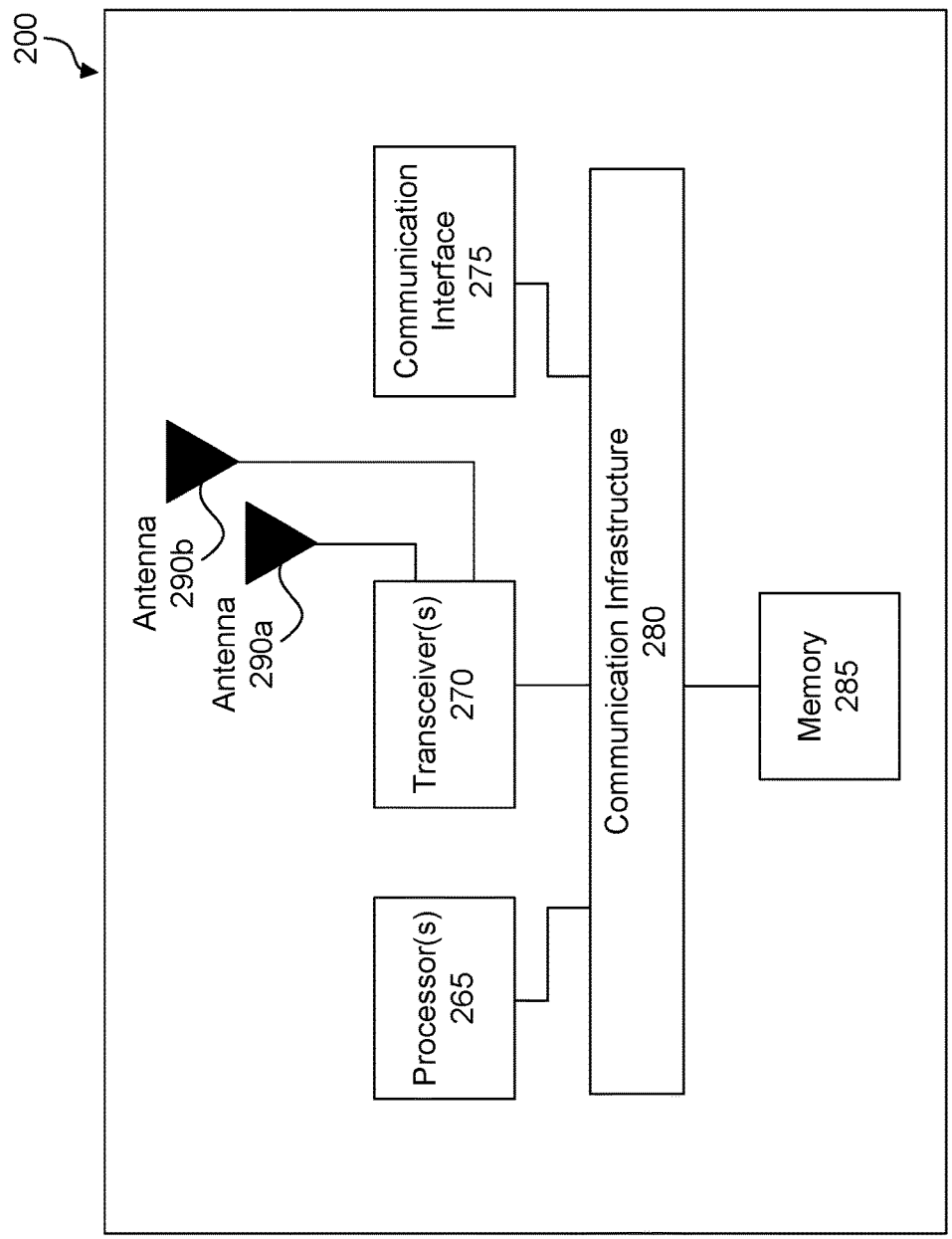
FIG. 2 illustrates a block diagram of an example wireless system supporting GCR-MLO, according to some embodiments of the disclosure.

FIG. 2 illustrates a block diagram of example wireless system 200 supporting GCR-MLO, according to some embodiments of the disclosure. For explanation purposes and not a limitation, FIG. 2 may be described with reference to elements from FIG. 1. For example, system 200 may be any of the electronic devices (e.g., AP MLD 110, non-AP MLDs 120a, 120b, 120c, legacy SLD station 130, and legacy non-GCR capable station 140) of system 100. System 200 includes one or more processors 265, transceiver(s) 270, communication interface 275, communication infrastructure 280, memory 285, and antenna 290. Memory 285 may include random access memory (RAM) and/or cache, and may include control logic (e.g., computer instructions) and/or data. One or more processors 265 can execute the instructions stored in memory 285 to perform operations enabling wireless system 200 to transmit and receive wireless communications, including the operations for performing GCR-MLO functions herein. In some embodiments, one or more processors 265 can be "hard coded" to perform the functions herein. Transceiver(s) 270 transmits and receives wireless communications signals including wireless communications supporting GCR-MLO according to some embodiments, and may be coupled to one or more antennas 290 (e.g., 290a, 290b). In some embodiments, a transceiver 270a (not shown) may be coupled to antenna 290a and different transceiver 270b (not shown) can be coupled to antenna 290b. Communication interface 275 allows system 200 to communicate with other devices that may be wired and/or wireless. Communication infrastructure 280 may be a bus. Antenna 290 may include one or more antennas that may be the same or different types.

Figure 3A:
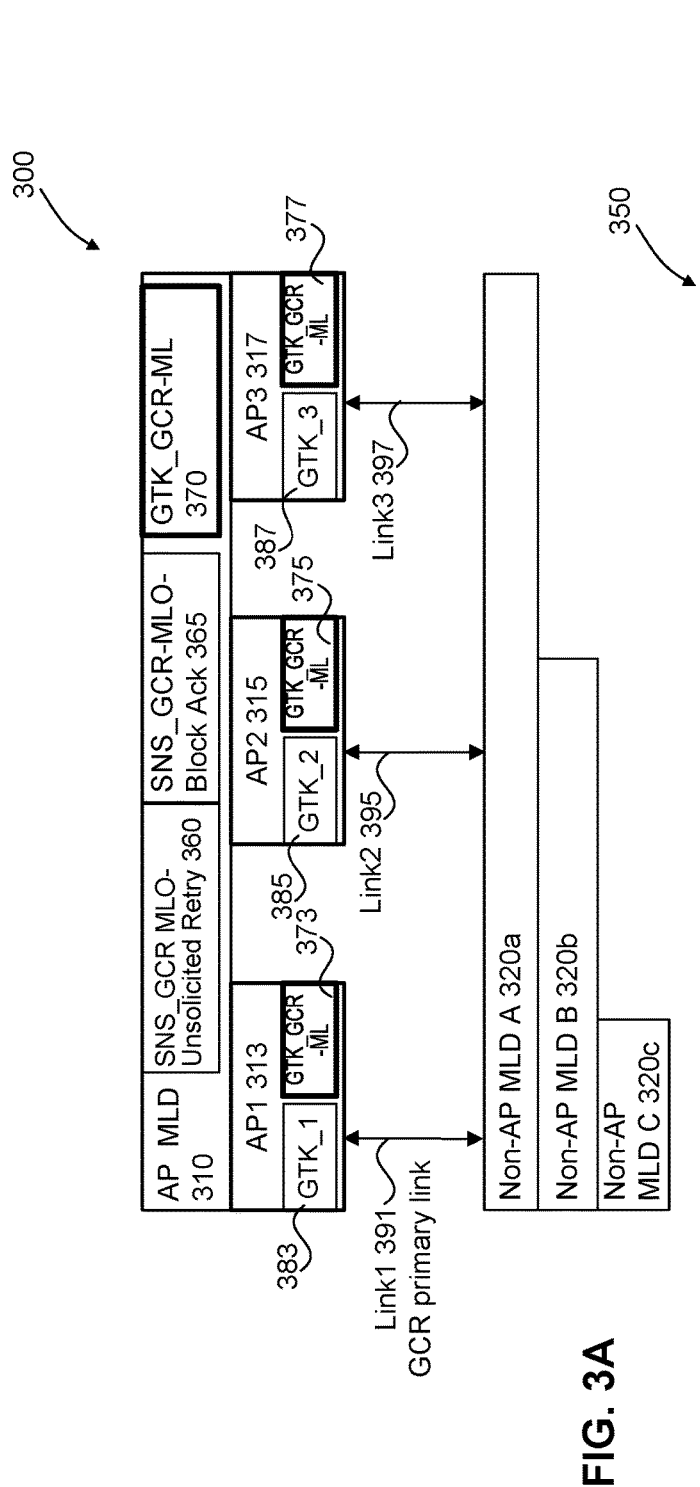
FIG. 3A illustrates an example system supporting GCR-MLO including a GCR primary link (mode 1), according to some embodiments of the disclosure.

FIG. 3A illustrates example system 300 supporting GCR-MLO including a GCR primary link (mode 1), according to some embodiments of the disclosure. For explanation purposes and not a limitation, FIG. 3 may be described with reference to elements from FIGS. 1 and 2. For example, AP MLD 310 can correspond to AP MLD 110 of FIG. 1, and non-AP MLD A 320a, non-AP MLD B 320b, and non-AP MLD C 320c can correspond to non-AP MLD 120a, 120b, 120c of FIG. 1.

AP MLD 310 can include multiple APs, each identified by a specific link. For example, AP1 313 can communicate via 2.4 GHz identified by link1 391; AP2 315 can communicate via 5 GHz identified by link2 395, and AP3 317 can communicate via 6 GHz identified by link3 397. In system 300, AP1 313, AP2 315, and AP3 317 may each have a radio transceiver that operates independently from the other radio transceivers. AP MLD 310 can utilize one or more radios (e.g., 3 transceivers) to communicate over multiple links (e.g., over one or more frequency bands) to non-AP MLD A 320a. For example, AP MLD 310 can utilize transceivers of AP1 313, AP2 315, and/or AP3 317 to communicate with non-AP MLD A 320a via link1 391, link2 395, and/or link3 397. AP MLD 310 can utilize transceivers of AP1 313 and/or AP2 315 to communicate with non-AP MLD B 320b via link1 391 and/or link2 395. AP MLD 310 can utilize the transceiver of AP1 313 to communicate with non-AP MLD C 320c via link1 391.

Non-AP MLD A 320a can scan and identify AP MLD 310 across all three links. After associating with AP MLD 310, non-AP MLD A 320a can communicate via any of the links link1 391, link2 395, and/or link3 397 that are available in, for example, three different frequency bands, e.g., 2.4 GHz, 5 GHz, and 6 GHz. If one link is busy, non-AP MLD, A 320a or AP MLD 310 selects another link that is first available.

AP MLD 310 can operate in GCR-MLO with at least the following retransmission policies: unsolicited retry and block acknowledgement (BA). GCR frames transmitted in GCR-MLO utilize sequence numbers of a sequence number space (SNS) that is determined at the MLD level including but not limited to: SNS_GCR-MLO_Unsolicited Retry 360 and SNS_GCR-MLO-BlockAck 365. When SNS_GCR-MLO_Unsolicited Retry 360 is implemented, sequence numbers generated at the MLD level and other parameters (e.g., group address (e.g., a group address corresponding to a GCR-MLO agreement and/or a GCR-MLO group), concealment address) in GCR frames can be used to detect duplicate GCR frames. The detection can be performed at the MLD level, and any duplicate GCR frame detected is discarded at the MLD level. In some embodiments, SNS_GCR-MLO_Unsolicited Retry may be the same as the general SNS that is used to deliver the group addressed frames delivery that are not subject to a GCR agreement. When SNS_GCR-MLO-BlockAck 365 is implemented, sequence numbers generated at the MLD level and other parameters (e.g., group address, concealment address, and/or traffic identifier (TID) in GCR frames can be used to detect duplicate GCR frames. The detection can be performed at the MLD level, and any duplicate GCR frame detected is discarded at the MLD level.

In some embodiments, when a GCR-MLO retry policy type transitions between Unsolicited Retry and Block Ack, AP MLD 310 transmits to a non-AP MLD (e.g., non-AP MLD A 320a) the last sequence number of the WIPDU corresponding to the GCR traffic flow that is being updated that was delivered prior to the GCR-MLO retry policy transition, to facilitate detection of any duplicate GCR frame caused by the GCR-MLO retry policy transition.

In some embodiments, SNS_GCR_MLO_Unsolicited Retry 360 allows multiplicity and is indexed by <address 1>. In some embodiments, SNS_GCR-MLO BlockAck allows multiplicity and is indexed by <address 1, TID>. For example, when SNS_GCR-MLO_BlockAck is implemented the BlockAck can be specific to the GCR address as well as to the TID. In some embodiments, the BlockAck can be agnostic to the TID. In some embodiments, SNS_GCR_M-LO_BlockAck can be merged with SNS2 in that is currently defined in IEEE P802.11REVme. For example, a modified SNS2 of IEEE P802.11REVme can be used by both unicast QoS (data) and GCR Block Ack frames, and the modified SNS2 can allow multiplicity, indexed by <address 1, TID>.

In addition, AP MLD 310 can generate group temporal keys (GTK) at the MLD level (e.g., GTK_GCR-multi-link (ML) 370) to encrypt and decrypt GCR frames at the MLD level as described below in Table 1. GCR-MLO Security. The corresponding replay attack detection/PN (packet number) check can be performed at the MLD level as well. To deliver a group addressed data frame that is not subject to a GCR agreement, GTK_link_i can be used for communication on link_i where i is an integer greater than zero.

TABLE 1

GCR-MLO Security

| Example | GTK_link_i | GTK_GCR-ML | Group Key Generation Method |
|---|---|---|---|
| 1. | GTK-ML is generated at the MLD level; GTK_link_i = GTK-ML, for all i | GTK_GCR-ML = GTK-ML= GTK_link_i, for all i | GTK-ML is generated using the method in 12.7.1.4 [IEEE P802.11REVme], where AA = AP MLD's MAC address |
| 2. | GTK-ML is generated at the MLD level; GTK_link_i = GTK-ML or a truncated version of GTK-ML | GTK_GCR-ML = GTK-ML | GTK-ML is generated using the method in 12.7.1.4 [IEEE P802.11REVme], where AA = AP MLD's MAC address |
| 3. | GTK_link_i is independent on each link i | GTK_GCR-ML is independent of GTK_link_i | GTK_link_i is generated using the method in 12.7.1.4 [IEEE P802.11REVme], where AA = AP_i's MAC address GTK-GCR-ML is generated using the method in 12.7.1.4 [IEEE P802.11REVme], where AA = AP MLD's MAC address, and GTK-GCR-ML, instead of GTK, is generated. |

In examples 1, 2 and 3 in the table above, GTK_link_i is the group key used for the delivery of group addressed data frames that are not subjected to a GCR agreement (e.g., non-GCR group addressed frames) on link i. GTK_GCR-ML is the group key used for the delivery of group addressed frames that are subject to a GCR agreement on all links.

Example 1 in the table above illustrates that the GTK-multi-link (ML) is generated at the MLD level, and the GTK for each link i, is equal to the GTK-ML for all links, i. For example, the GTK-ML generated at the MLD level is shown as GTK_GCR-ML 370 in system 300. The GTK_link_1 (e.g., Link1 391) used by AP1 313 can be GTK_GCR-ML 373 (which is identical to GTK_GCR-ML 370). Thus, GTK_GCR-ML 370 can be used to encrypt and decrypt GCR frames that are transmitted and received. AP2 315 can use GTK_GCR-ML 375 (which is identical to GTK_GCR-ML 370) to encrypt and decrypt GCR frames that are transmitted and received. AP3 317 can use GTK_GCR-ML 377 (which can be identical to GTK_GCR-ML 370) to encrypt and decrypt GCR frames that are transmitted and received.

Example 2 illustrates that the GTK-ML is generated at the MLD level, and the GTK for each link i, is equal to the GTK-ML or a truncated version of GTK-ML for all links, i. For example, each GTK_link_i, for all i, is either identical to or a truncated version of GTK-ML. The GTK-ML generated at the MLD level is shown as GTK_GCR-ML 370 in system 300. The GTK_link_1 (e.g., link1 391) used by AP1 313 can be identical to or a truncated version of GTK_GCR-ML 373 (which is identical to GTK_GCR-ML 370). Thus, GTK_GCR-ML 370 or a truncated version of GTK_GCR-ML 370 can be used to encrypt and decrypt group addressed frames that are not subject to a GRC agreement and are transmitted and received on link1 391. Similarly, the GTK_link_2 (e.g., link2 395) used by AP2 315 can be identical to or a truncated version of GTK_GCR-ML 375 (which is identical GTK_GCR-ML 370). Thus, GTK_GCR-ML 370 or a truncated version of GTK_GCR-ML 370 can be used to encrypt and decrypt GCR group addressed frames that are not subject to a GCR agreement and are transmitted and received on link2 395. The GTK_link_3 (e.g., link3 397) used by AP3 317 can be identical to or a truncated version of GTK_GCR-ML 375 (which is identical GTK_GCR-ML 370). Thus, GTK_GCR-ML 370 or a truncated version of GTK_GCR-ML 370 can be used to encrypt and decrypt GCR group addressed frames that are not subject to a GCR agreement and are transmitted and received on link3 397. AP1 313 can use GTK_GCR-ML 373 (which is identical to GTK_GCR-ML 370) to encrypt and decrypt GCR frames that are transmitted and received on link1 315. AP2 315 can use GTK_GCR-ML 375 (which is identical to GTK_GCR-ML 370) to encrypt and decrypt GCR frames that are transmitted and received on link2 395. AP3 317 can use GTK_GCR-ML 377 (which can be identical to GTK_GCR-ML 370) to encrypt and decrypt GCR frames that are transmitted and received on link3 397.

Example 3 illustrates that the GTK for links i are independent and is generated at each AP level instead of the MLD level. For group addressed frames not subject to a GCR-MLO agreement (e.g., non-GCR group addressed frames), AP1 313 can use a link-specific GTK (e.g., GTK_1 383) independent of GTK_GCR-ML 370 generated at the MLD level, to encrypt and decrypt group addressed frames that are not subject to a GCR agreement and are transmitted and received on link1 391. AP2 315 can use a link-specific GTK (e.g., GTK_2 385), independent of GTK_GCR-ML 370 generated at the MLD level to encrypt and decrypt group addressed frames that are not subjected to a GCR agreement and are transmitted and received on link2 395. AP3 317 can use a link-specific GTK (e.g., GTK_3 387), independent of GTK_GCR-ML 370 generated at the MLD level, to encrypt and decrypt group addressed frames that are not subject to a GCR agreement and are transmitted and received on link3 397.

AP MLD 310 can operate in at least two modes: Mode 1 with a GCR primary link, and mode 2 with a GCR primary link set, where a GCR primary link or GCR primary link set is where the initial GCR frame transmission occurs. Retransmitted GCR frames can occur either on a GCR primary link, GCR primary link sets, or non-primary links. Assume that a GCR-MLO group includes non-AP MLD A 320a, non-AP MLD B 320b, and non-AP MLD C 320c that are each subject to a GCR-MLO agreement with AP MLD 310. When all members of the GCR-MLO group are available on a common link (e.g., link1 391) during a GCR frame delivery time, AP MLD 310 can assign link1 391 as the GCR primary link. Thus, non-AP MLD B 320b, and non-AP MLD C 320c can receive an initial GCR frame transmitted via link1 391, the GCR primary link, during a GCR frame delivery time, and retransmitted GCR frames via primary link1 391 or non-primary link2 395 or non-primary link3 397. Non-AP MLD A 320a, non-AP MLD B 320b, and non-AP MLD C 320c all can detect and discard a duplicate GCR frame received on any or all links at the MLD level.

Figure 3B:
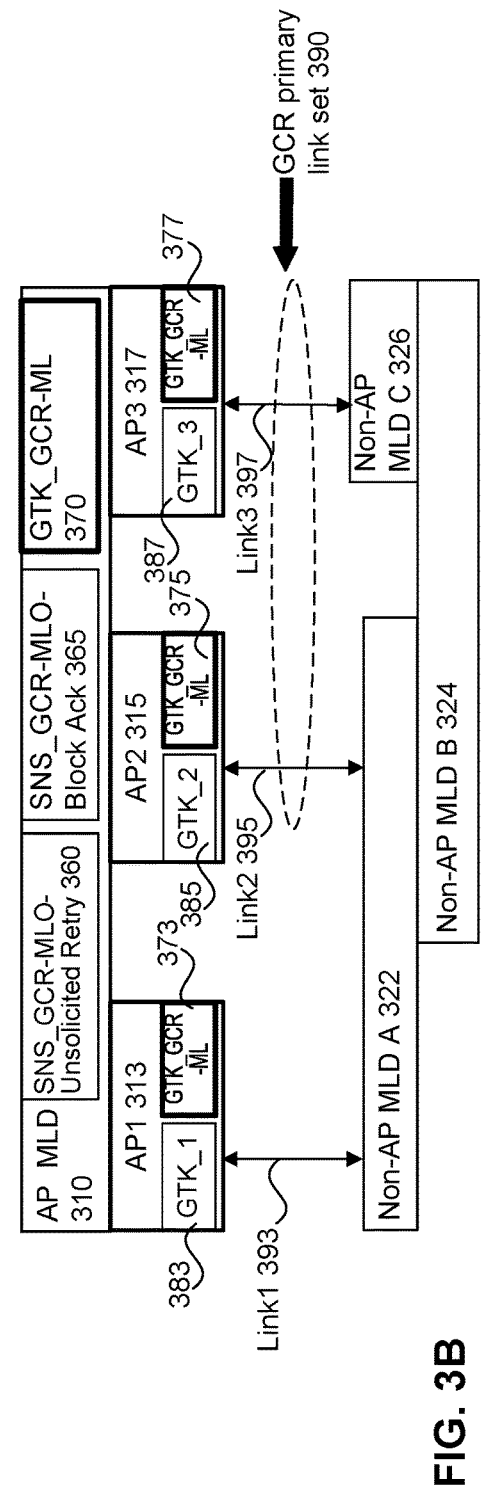
FIG. 3B illustrates an example system supporting GCR-MLO including a GCR primary link set (mode 2), according to some embodiments of the disclosure.

FIG. 3B illustrates example system 350 supporting GCR-MLO including a GCR primary link set (mode 2), according to some embodiments of the disclosure. For explanation purposes and not a limitation, FIG. 3 may be described with elements from FIGS. 1, 2, and 3A. For example, AP MLD 310 can correspond to AP MLD 110 of FIG. 1, and descriptions with the same labels as system 300 are not repeated here. Non-AP MLD A 322, non-AP MLD B 324, and non-AP MLD C 326 can correspond to non-AP MLD 120a, 120b, 120c of FIG. 1.

Assume that a GCR-MLO group includes non-AP MLD A 322, non-AP MLD B 324, and non-AP MLD C 326 that are each subject to a GCR-MLO agreement with AP MLD 310. In system 350, for example, members of the GCR-MLO group are not available on a common link. For example, only non-AP MLD A 322 can communicate via link1 393. Since all members of the GCR-MLO group are not available on a common link during a GCR frame delivery time, AP MLD 310 can assign one or more links (e.g., link2 395 and link3 397) as primary links of the GCR primary link set 390. Thus, during a GCR frame delivery time, non-AP MLD A 322 and/or non-AP MLD B 324 can receive an initial GCR frame transmitted from AP MLD 310 via link2 395, while non-AP MLD C 326 and/or non-AP MLD B 324 can receive an initial GCR frame transmitted from AP MLD 310 via link3 397, and non-AP MLD A 322 can receive retransmitted GCR frames on link1 393 or link2 395, non-AP MLD B 324 can receive retransmitted GCR frames on link2 395 or link3 397, non-AP MLD C 326 can receive retransmitted GCR on link3 397. Non-AP MLD A 322, non-AP MLD B 324, and non-AP MLD C 326 all can detect and discard a duplicate GCR frame at the MLD level.

Referring back to FIG. 1, AP MLD 110 can obtain membership of a multicast group corresponding to a group address. For example, AP MLD 110 can transmit a Group membership Request frame to request the content of the dot11GroupAddressTable of the associated stations per IEEE 802.11 methods, or utilize another method outside of IEEE 802.11. AP MLD 110 can establish a GCR-MLO agreement at the MLD level. A non-AP MLD (e.g., non-AP MLD 120a can transmit or receive frames to establish or update a GCR-MLO agreement on any link (e.g., link2 395 or link3 397 of FIGS. 3A and 3B.) After the GCR-MLO agreement is established, the GCR frames can be delivered on links (e.g., link1 391) that may not be the same link used to establish the GCR-MLO agreement. If a GCR-MLO group contains members that are pre-EHT legacy devices that support single-link operation (e.g., legacy SLD station 130), the GCR primary link (as in mode 1) or one link of the GCR primary link set (as in mode 2) needs to be the same link where the pre-11be legacy device that support single-link operation operates.

AP MLD 110 can exchange information with each member of the multicast group that supports GCR-MLO to setup and/or update GCR-MLO agreements. A multicast group that includes one or more non-AP MLD members (e.g., non-AP MLD 120a-120c) that establish a GCR-MLO agreement with an AP MLD (e.g., AP MLD 110) can be called a GCR-MLO group, and the corresponding group address can be called a GCR group address. The GCR-MLO group can include legacy stations that are GCR-incapable (e.g., legacy non-GCR station 140). For example, legacy non-GCR station 140 can receive the group addressed frames that are not retransmitted (e.g., no-Ack/No-retry transmission of the group addressed frames), but does not support GCR (e.g., group recast with retries). When the group addressed frame is to be retransmitted per the GCR-MLO agreement, AP MLD 110 can conceal the group address from legacy stations (e.g., by assigning and containing a concealment address in an aggregate medium access control (MAC) service data unit (A-MSDU) frame). See FIG. 9A below.

Figure 6:
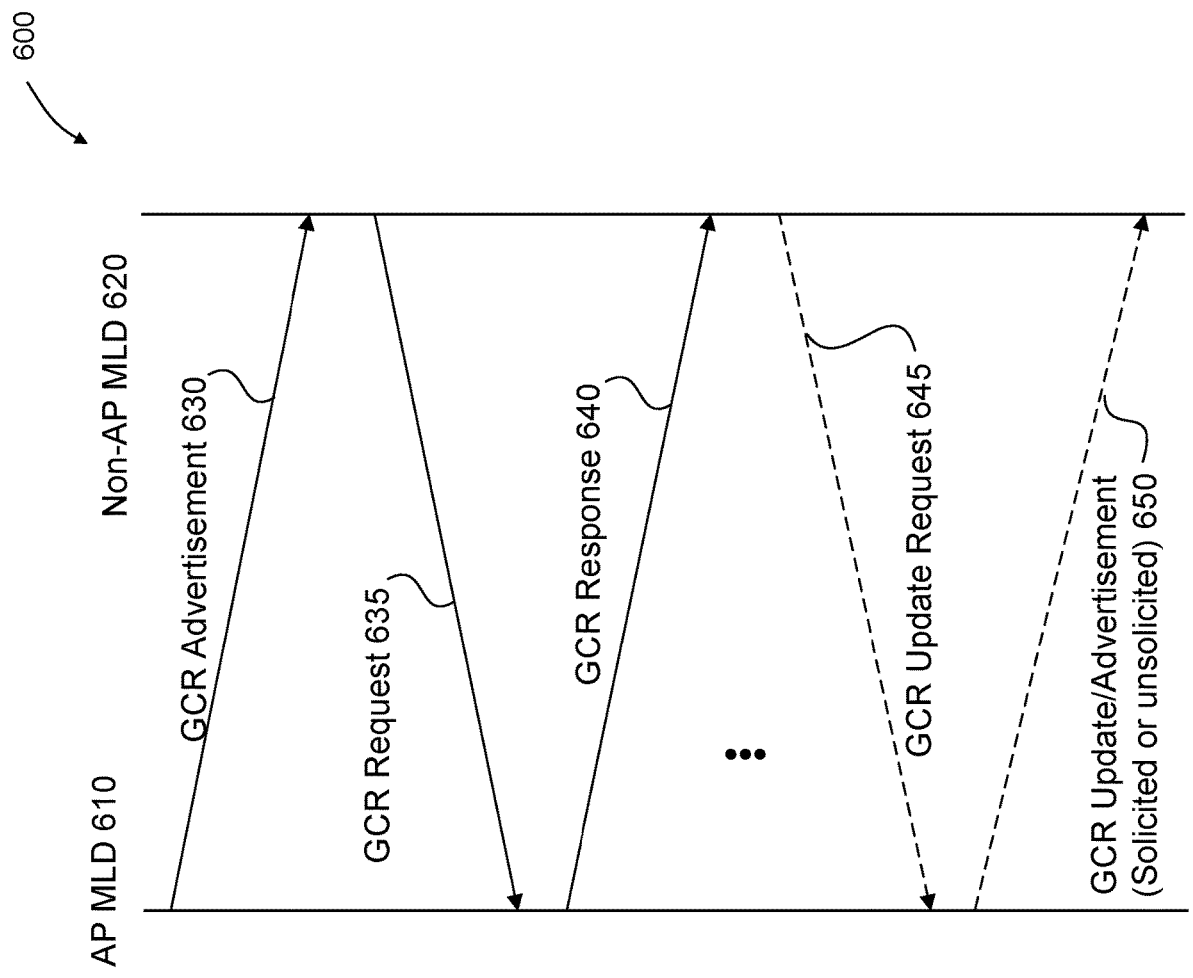
FIG. 6 illustrates an example method for GCR-MLO agreement setup and updates, according to some embodiments of the disclosure.

FIG. 6 illustrates example method 600 for GCR-MLO agreement setup and updates, according to some embodiments of the disclosure. For explanation purposes and not a limitation, FIG. 6 may be described with reference to elements from other figures within the disclosure. For example, AP MLD 610 can correspond to AP MLD 110 of FIG. 1, and non-AP MLD 620 can correspond to non-AP MLD 120a, 120b, 120c of FIG. 1. The information exchanged between AP MLD 610 and non-AP MLD 620 is shown below in Table 2. GCR-MLO Agreement Setup & Updates.

delivery time (e.g., non-GCR-SP or GCR-SP), retry method (e.g., unsolicited retry or BA), and/or GCR primary link or GCR primary link set.

At 640, AP MLD 610 transmits a GCR Response that can be received by non-AP MLD 620. The GCR Response informs non-AP MLD 620 of the GCR-MLO operation parameters that AP MLD 610 has selected. The GCR-MLO operation parameters may be different than the information that non-AP MLD 620 included in the GCR Request. The GCR Response can include but is not limited to: Group address, concealment address, assigned delivery time (e.g., non-GCR-SP or GCR-SP), retry method (e.g., unsolicited retry or BA), SP details if GCR-SP, GCR primary link or GCR primary link set, and/or an association identifier (AID) for GCR, $AID_{GCR}$.

An AP MLD can use one or more of the currently reserved AID values to assign an AID to be used for a GCR frame transmission in a DL MU PPDU. The AID assignment types are described in Table 3. AID Assignment Types below.

TABLE 2

GCR-MLO Agreement Setup & Updates

| Exemplary Frame | Transmitter | Purpose | Exemplary Frame Content |
|---|---|---|---|
| GCR Advertisement | AP MLD | Advertise the availability of GCR service for a group address | Group address, delivery time (e.g., non-GCR-SP or GCR-SP info), retry method (e.g., unsolicited retry or BA), GCR primary link or GCR primary link set |
| GCR Request | Non-AP MLD | Request to use GCR-MLO service for a group address | Group address, requested delivery time (e.g., non-GCR-SP or GCR-SP), retry method (e.g., unsolicited retry or BA), GCR primary link or GCR primary link set |
| GCR Response | AP MLD | Response to a GCR request with assigned GCR-MLO operation parameters | Group address, concealment address, assigned delivery time (e.g., non-GCR-SP or GCR-SP), retry method (e.g., unsolicited retry or BA), SP details if GCR-SP, GCR primary link or GCR primary link set, $AID_{GCR}$ |
| GCR update request | Non-AP MLD | Request to change in GCR operation parameters | Group address, requested updated delivery time (e.g., non-GCR-SP or GCR-SP info.), retry method (e.g., unsolicited retry or BA), GCR primary link or GCR primary link set |
| GCR update (solicited or unsolicited) | AP MLD | GCR operation parameter updates, either as a response to an update request and transmitted unsolicited | Group address, concealment address, assigned updated delivery time (e.g., non-GCR-SP or GCR-SP info.), retry method (e.g., unsolicited retry or BA), SP details if GCR-SP, GCR primary link or GCR primary link set, $AID_{GCR}$ |

At 630, AP MLD 610 transmits a GCR Advertisement that is received by non-AP MLD 620. The GCR Advertisement advertises the availability of GCR service for a group address. The GCR Advertisement can include but is not limited to: Group address, delivery time (e.g., non-GCR-service (SP) or GCR-SP information), retry method (e.g., unsolicited retry or block acknowledgement (BA)), GCR primary link (mode 1) or GCR primary link set (mode 2).

At 635, non-AP MLD 620 transmits a GCR Request that can be received by AP MLD 110. The GCR Request requests GCR-MLO service for the group address. The GCR Request can include but is not limited to: Group address, requested

TABLE 1

AID Assignment Types

| Option | AID assignment type | Description |
|---|---|---|
| 1 | GCR group specific AID assignment | AP MLD assigns an AID for a specific GCR group with the corresponding group address, called "$AID_{GCR}$", and transmit such an $AID_{GCR}$ in a GCR Response frame during the GCR-MLO agreement setup. The RU allocation for this $AID_{GCR}$ in a DL MU PPDU is only |

TABLE 1-continued

AID Assignment Types

| Option | AID assignment type | Description |
|---|---|---|
| 2 | Common AID for all GCR groups | used for the transmission of GCR frames with a particular group address, which is in turn associated with this $AID_{-GCR}$. An AID (e.g., specified in the IEEE 802.11be spec) where the RU allocation for this AID is used for GCR frame transmission for all GCR groups. |

In option 1, the $AID_{-GCR}$ corresponds to a specific GCR-MLO group. For example, AP MLD 610 can assign an AID for a specific GCR-MLO group corresponding to the group address. AP MLD 610 can transmit the $AID_{-GCR}$ in GCR Response 640 during method 600 for GCR-MLO agreement setup and updates. AIDs are used to assign Resource Units (RUs) to receivers in RU allocations. The RU allocation corresponding to a particular $AID_{-GCR}$ in a downlink (DL) multi-user (MU) Physical Layer Convergence Protocol (PLCP) protocol data unit (PPDU) corresponds to the respective group address corresponding to the particular AID GCR. Thus, the RU allocation corresponding to the particular $AID_{-GCR}$ is used only for the transmission of a GCR frame corresponding to the respective group address. The designated RU for a particular GCR group (option 1) facilitates the GCR frame delivery corresponding to the GCR group when there are a large number of group addressed frames in the network.

Figure 5:
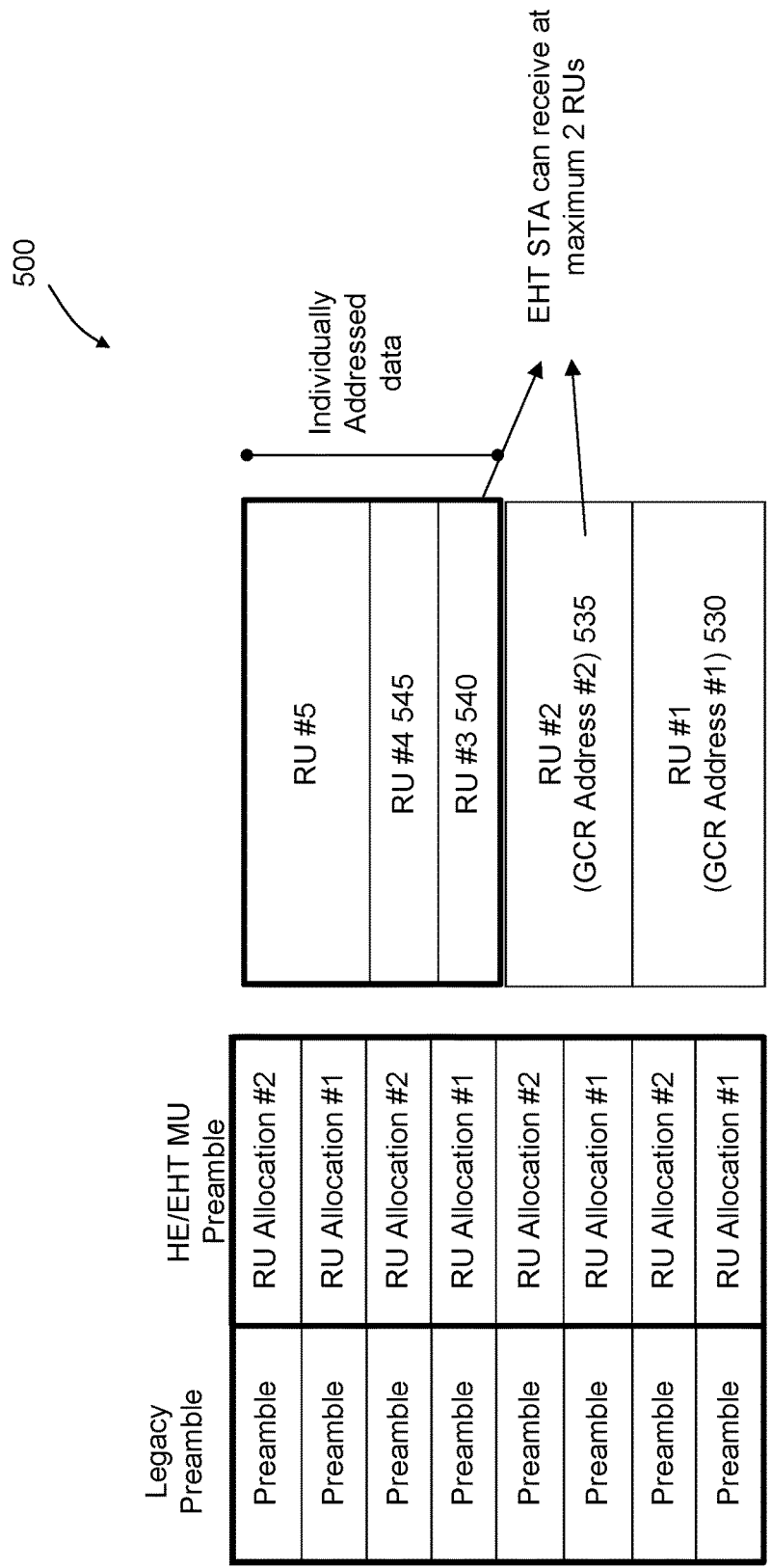
FIG. 5 illustrates an example of Association Identifier (AID) assignment for GCR-MLO, according to some embodiments of the disclosure.

FIG. 5 illustrates example 500 of AID assignment for GCR-MLO, according to some embodiments of the disclosure. For explanation purposes and not a limitation, FIG. 5 may be described with reference to elements from other figures within the disclosure. For example, AP MLD 610 can assign a first $AID_{-GCR}$ for a first GCR-MLO group corresponding to GCR group address #1, and a second $AID_{-GCR}$ for a second GCR-MLO group corresponding to GCR group address #2. GCR group address #1 can be a first group address subject to a first GCR-MLO agreement and GCR group address #2 can be a second group address subject to a second GCR-MLO agreement.

AP MLD 610 can transmit an MU PPDU that is received by a non-AP MLD (e.g., non-AP MLD 620). For example, non-AP MLD 620 can receive the following in one MU PPDU: i) 2 RUs corresponding to $AID_{-GCR}$ assignments: e.g., RU #1 530 for $GCR_{-AID1}$ & RU #2 535 for $GCR_{-AID2}$; ii) one RU corresponding to one $AID_{-GCR}$ assignment and one RU of an individually addressed data frame: e.g., RU #2 535 for $GCR_{-AID2}$ and RU #3 540 for individual addressed data; or iii) 2 RUs of individually addressed data frames: e.g., RU #4 545 and RU #3 540.

In option 2, the AID is common for all GCR groups. Thus, the $AID_{-GCR}$ may be common to any and all GCR groups.

Returning to FIG. 6, at 645, non-AP MLD 620 can transmit a GCR Update Request that can be received by AP MLD 610. The GCR Update Request can request a change in GCR operation parameters. The GCR Update Request can include but is not limited to: Group address, requested updated delivery time (e.g., non-GCR-SP or GCR-SP information), retry method (e.g., unsolicited retry or BA), and/or GCR primary link or GCR primary link set.

At 650, AP MLD 610 can transmit a GCR Update/Advertisement that can be solicited (e.g., in response to the received GCR Update Request 645) or unsolicited (e.g., based on changes in AP MLD 610 resources.) The GCR Update/Advertisement can be received by non-AP MLD 620 and can include but is not limited to: Group address, concealment address, assigned updated delivery time (e.g., non-GCR-SP or GCR-SP information), retry method (e.g., unsolicited retry or BA), SP details if GCR-SP, GCR primary link (mode 1) or GCR primary link set (mode 2), and/or $AID_{-GCR}$.

In some embodiments, method 600 can be performed by re-using and modifying a Direct Multicast Service (DMS) Request/Response frame exchanged used by GCR-single link operation (SLO) to set up a GCR-MLD agreement. For example, some embodiments include modifying Table 9-230 of IEEE P802.11REVme_D0.0 for the DMS Descriptor. AP MLD 610 can use one of the reserved subelement IDs (e.g., reserved value "2") defined to be a "GCR-MLO Request" to contain GCR operation parameters that are only applicable to multi-link operation in GCR Request 635. In addition, some embodiments include using the existing "subelement ID=1" to carry operation parameters pertinent to both single-link operation and multi-link operation.

Some embodiments include modifying Table 9-234 of IEEE P802.11REVme_D0.0 for the DMS Status. AP MLD 610 can use one of the reserved subelement IDs (e.g., reserved value "2") defined to be a "GCR-MLO Response" to contain GCR operation parameters that are only applicable to multi-link operation in GCR Response 640. Some embodiments include using the existing "subelement ID=1" to carry operation parameters pertinent to both single-link and multi-link operation, including the SP description in the "Schedule Element" field of the "GCR Response" subelement (as shown in FIG. 9-480 of IEEE P802.11REVme_D0.0.)

A GCR-MLO agreement established between AP MLD 610 and non-AP MLD can include a combination of delivery methods and retransmission (ReTx) policies as shown below in Table 4. GCR-MLO Agreement Types.

TABLE 2

GCR-MLO Agreement Types

| | ReTx policy | |
|---|---|---|
| Delivery method | GCR-MLO unsolicited retry | GCR-MLO block ack |
| non-GCR-SP (GCR frames delivered after No-Ack/No-Retry group addressed frames after DTIM beacons) | Type 1 | Type 2 |
| GCR-SP (GCR frames delivered at scheduled time) | Type 3 | Type 4 |

Only one of the four types of GCR-MLO agreement types is active at a time for frames subject to one group address. Two types of retransmission policies include GCR-MLO unsolicited retry and GCR-MLO block acknowledgement (BA). When GCR-MLO unsolicited retry is implemented, AP MLD 610 can determine a number of retries for a GCR frame. When GCR-MLO BA is implemented, AP MLD 610 can send a BA Request (BAR) to non-AP MLD 620 to obtain a BA from non-AP MLD 620. AP MLD 610 can determine whether to retransmit a GCR frame based on the received BA.

Figure 4A:
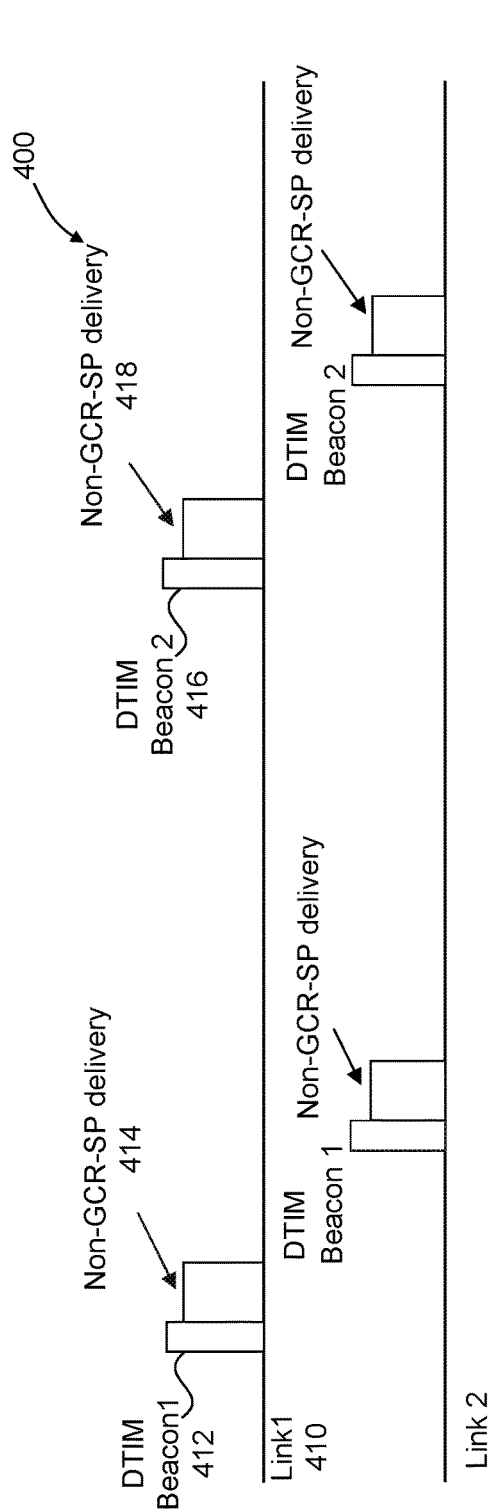
FIG. 4A illustrates an example of GCR-MLO non-GCR-service period (SP) delivery time, according to some embodiments of the disclosure.

FIG. 4A illustrates example 400 of GCR-MLO non-GCR-service period (SP) delivery time, according to some embodiments of the disclosure. For explanation purposes and not a limitation, FIG. 4A may be described with reference to elements from other figures in the disclosure. For example, AP MLD 310 of FIG. 3 can transmit Delivery Traffic Indication Message (DTIM) Beacon1 412 immediately before the non-GCR-SP delivery time 414. Further, Link1 410 and Link2 can correspond to Link2 395 and Link3 397 of GCR primary link set 390 of FIG. 3B.

Example 400 illustrates a non-GCR-SP delivery method. AP MLD 310 can transmit DTIM Beacon1 412 on Link1 410 followed (e.g., immediately followed) by non-GCR-SP delivery time 414. Within non-GCR-SP delivery time 414, No-Ack/No-Retry group addressed frames are transmitted followed by any GCR frame transmissions. After DTIM Beacon2 416 is transmitted, non-GCR-SP delivery time 418 begins. Any No-Ack/No-Retry group addressed frames are delivered followed by any GCR frame transmissions. Note that the GCR frames, as well as a number of retries of the respective GCR frames may be different in each of the non-GCR-SP delivery times 414 and 418. A similar process occurs on Link2 of example 400. In some embodiments, for agreement type 2 of Table 4. GCR-MLO Agreement Types above, non-GCR-SP with GCR-MLO BA, if all members of a GCR BA are awake (e.g., not asleep or in power save mode) at any particular time, AP MLD 310 can transmit GCR frames immediately, without waiting for the DTIM beacon.

Figure 4B:
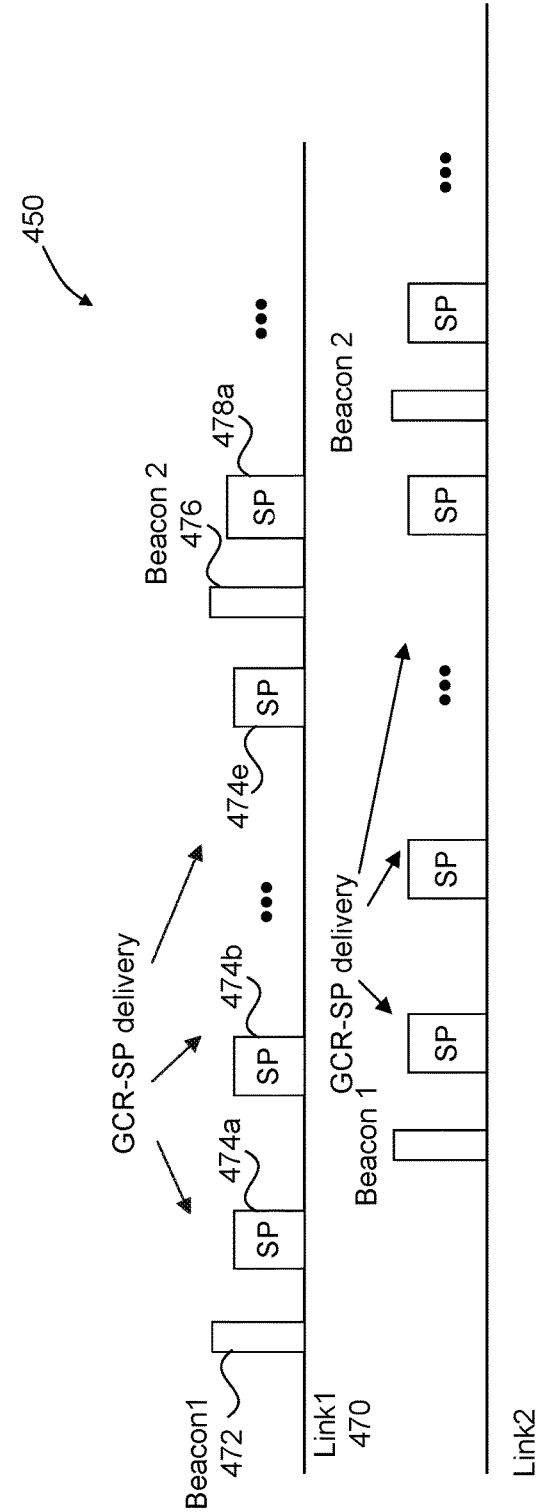
FIG. 4B illustrates an example of GCR-MLO GCR-SP delivery time, according to some embodiments of the disclosure.

FIG. 4B illustrates example 450 of GCR-MLO GCR-SP delivery time, according to some embodiments of the disclosure. For explanation purposes and not a limitation, FIG. 4B may be described with elements from other figures in the disclosure. For example, AP MLD 310 of FIG. 3 can transmit Beacon1 472 and use scheduled GCR-SPs 474a-474e. Further, Link1 470 and Link2 can correspond to Link2 395 and Link3 397 of GCR primary link set 390 of FIG. 3B. Example 450 illustrates a GCR-SP delivery method where AP MLD 310 can deliver GCR frames within scheduled service periods (SP).

For example, AP MLD 310 can transmit Beacon1 472 on Link1 470 and transmit GCR frames within the scheduled GCR-SPs 474a-474e. Similarly, AP MLD 310 can transmit Beacon2 476 and subsequently transmit one or more GCR frames within scheduled GCR-SP 478a and so on. The GCR frames can be different in each of the GCR SPs 474a-474e and 478a. A similar process occurs on Link2 of example 450.

GCR operation parameters described in Table 2. GCR-MLO Agreement Setup & Updates can be further described in Table 5. GCR Operation Parameters below. The inclusion of a single GCR primary link information indicates the operation is in mode 1, and the inclusion of a GCR primary link set indicates the operation is in mode 2 as described with regard to FIGS. 3A and 3B. In some embodiments, the GCR operation parameters assigned by AP MLD 610 in a GCR-Response/Update/Advertisement frame (e.g., 640, 650, 630 of FIG. 6) may not be the same as the parameters requested by a particular station (e.g., non-AP MLD 620 in GCR Request 635 of FIG. 6.) AP MLD 610 chooses the operations parameters based at least on inputs received from members of a GCR-MLO group and AP MLD 610's resource limitations. For example, AP MLD 610 may receive a GCR Request 635 from non-AP MLD 620 requesting a GCR-SP duration of 5 msec. AP MLD 610 may also receive another GCR Request (not shown) from another non-AP MLD requesting a GCR-SP duration of 3 msec. Based on the GCR Requests received as well as AP MLD 610's resources, AP MLD 610 may set the GCR-SP duration to be 5 msec.

TABLE 5

GCR Operation Parameters

| GCR Method/Mode | Common Parameters | Method/Mode-Specific Parameters |
|---|---|---|
| GCR-MLO Unsolicited Retry/Mode 1 | Concealment address Delivery time If GCR-SP is used, the specific information on the SPs (e.g., start time expressed by TSF or offset to Beacon Transmit Time or other methods, duration, cadence) If GCR-SP is used, whether non-AP MLD will skip some SPs. AID assignment corresponding to either a specific GCR group or all GCR groups. | GCR primary link max number of retry |
| GCR-MLO Unsolicited Retry/Mode 2 | | GCR primary link set max number of retry |
| GCR-MLO Block Ack/Mode 1 | | GCR primary link |
| GCR-MLO Block Ack/Mode 2 | | GCR primary link set the nominal link to receive GCR BAR and transmit BA if a non-AP MLD operates on more than one link of the GCR primary link set |

In some embodiments, other signaling/frames methods may be used to exchange the GCR-MLO parameters described in FIG. 6, Table 2. GCR-MLO Agreement Setup & Updates, and Table 5. GCR Operation Parameters. For example, broadcast or group cast frames, instead of individually addressed frames, can be used for establishing a GCR-SP. A broadcast approach (e.g., including the container of the information, such as an element, subelement, in the beacons/Probe Responses) can be used if channel access protection for the SP is desired. In some embodiments, a Broadcast TWT element can be modified to indicate that a particular Broadcast TWT SP is used for transmission of GCR frames subject to a particular GCR-MLO agreement, by including a GCR-MLO agreement identifier (e.g., a concealment address, or GCR group ID) in a container for information on a specific Broadcast TWT SP. When a GCR-SP is used for low latency service, a scheduling method for low latency service (e.g., restrictive TWT) can be modified for the GCR-SP establishment. For example, a container that includes an rTWT schedule can include an indication (e.g., a field, subfield, subelement, etc) to indicate such an rTWT schedule is used for GCR transmission. In some embodiments, a groupcast or unicast approach can be used. For example, GCR-SP information can be transmitted to GCR group members in a group addressed frame or an individually addressed frames.

A GCR-SP is necessary for low latency service. GCR SP can be setup with broadcast signaling, group cast, or unicast signaling as described above. Service periods (SPs) are link specific. Each SP can be initiated and terminated separately in their respective link. Different links may have SPs operating at the same time (e.g., overlapping in time.) For mode 2 of both GCR-MLO unsolicited retry and GCR-MLO Block Ack, when a GCR-SP is used for low latency service (e.g., agreement types 3 and 4 of Table 4. GCR-MLO Agreement Types), the Service Periods on all links (e.g., all the primary links) of the GCR primary link set should be synchronized or semi-synchronized to render low latency delivery of traffic, where the semi-synchronized GCR-SPs on different links enable the delivery of latency sensitive traffic on different links to be close in time so that the low latency requirement is met. For example, a GCR frame is delivered on one link at time 1 and on another link at time 2, and the time gap between time 1 and time 2 is sufficiently small so that reception on both links can meet the low latency requirement. In some embodiments, AP MLD 110 schedules SPs based on non-AP MLD 120a-120c and/or legacy SLD station 130's inputs (e.g., service requirements delivered in their traffic specification (TSPEC) or by other means.)

FIG. 7A illustrates example 700 of GCR Multi-User (MU) Block Acknowledgement Request (BAR) for early SP termination, according to some embodiments of the disclosure. FIG. 7B illustrates example 750 of GCR MU BAR for early SP termination, according to some embodiments of the disclosure. For explanation purposes and not a limitation, FIGS. 7A and 7B may be described with reference to elements from other figures in the disclosure. For example, the AP may be AP MLD 310 of FIG. 3 that can transmit Beacon1 472 and delivers GCR frames within for example, GCR-SP 475a of FIG. 4B. In examples 700 and 750, a GCR-SP is of maximum SP duration length, t1. In some embodiments, STA include stations that are a member of a GCR-MLO group such as non-AP MLD stations: STA1, STA2, STA3, STA4, and STA5 that have BA agreements with the AP. In some embodiments, some non-AP MLD STAs may return to power save modes at the end of a GCR-SP, or earlier if the non-AP MLD STA receives one or more of the following information or indications during a GCR-SP and/or a Target Wake Time (TWT) SP:

More Trigger Frame (TF)=0 in Trigger frame: member stations (STAs) of the GCR-MLO group that have no resource unit (RU) allocation in the trigger frame may go to doze;

End of service period (EOSP)=1 or More Data (MD)=0 in a GCR Data (e.g., GCR frame) or a QoS Null frame;

A GCR-SP termination indication.

After receiving one or more of the indications, a receiving non-AP MLD STA can return to doze (e.g., a power save mode.) Example 700 is described further below:

At 705, the AP can transmit GCR data frames, indications MD=1, eosp=0, and the GCR Address (e.g., addressed to the GCR-MLO group) during a GCR-SP of maximum SP duration length, t1.

At 710, subsequent to transmitting data frames 705, the AP can transmit a GCR MU BAR trigger frame that include Resource Unit (RU) allocations for STA1, STA2, STA3, STA4, and STA5. In addition, the AP indicates More TF=1.

At 715, STA4 and STA5 signal in their BA that they have received the GCR frames correctly. STA1, STA2, and STA3 indicate in their BA that they have not received their GCR frames correctly.

At 720, the AP retransmits the missed data and indicates MD=1, eosp=0.

At 725, subsequent to transmitting data frames 720, the AP can transmit a GCR MU BAR trigger frame that include RU allocations for STA1, STA2, STA3. In addition, the AP indicates More TF=0. There are no RU allocations for STA 4 and STA 5, thus STA 4 and STA 5 can return to doze. In other words, the GCR SP is terminated for STA 4 and STA 5.

At 730, STA1, STA2, and STA3 signal in their BA that they have received their GCR frames correctly.

At 735, the AP can transmit a GCR frame or a QoS Null frame indicating MD=0 and eosp=1 that terminates the GCR-SP for all stations (e.g., STA1, STA2, and STA3.) Thus, the GCR-SP can end for stations before the maximum SP duration, t1.

FIG. 7B illustrates another example of GCR MU BAR for early SP termination, according to some embodiments of the disclosure. Example 750 is described further below:

At 755, the AP can transmit GCR data frames, indications MD=1, eosp=0, and the GCR Address (e.g., addressed to the GCR-MLO group) during a GCR-SP of maximum SP duration length, t1.

At 760, subsequent to transmitting data frames 755, the AP can transmit a GCR MU BAR trigger frame that include Resource Unit (RU) allocations for STA1, STA2, STA3, STA4, and STA5. In addition, the AP indicates More TF=0. The GCR MU BAR trigger frame may contain the sequence number of the last transmitted GCR MPDU. If a STA receives all MDPUs from the sequence signaled in the last transmitted GCR data frame (e.g., at 755), then a station may return to doze. Otherwise, a STA remains awake.

At 765, STA4 and STA5 signal in their BA that they have received the GCR frames correctly. Accordingly, STA4 and STA5 may terminate their SP and return to doze. STA1, STA2, and STA3 indicate in their BA that they have not received their GCR frames correctly, so they remain awake.

At 770, the AP retransmits the missed data and indicates MD=1, eosp=0.

At 775, subsequent to transmitting data frames 770, the AP can request BA from STA1, STA2, and STA3 by transmitting a GCR MU BAR trigger frame that include RU allocations for STA1, STA2, STA3. In addition, the AP indicates More TF=0.

At 780, STA1, STA2, and STA3 signal in their BA that they have received their GCR frames correctly and they can return to doze. In some embodiments, the More TF=0 terminates the SP. Any STA that have RU allocations terminate SP after receiving their GCR frames correctly. Thus, the GCR-SP can end for stations before the maximum SP duration, t1.

A summary of Receive Address (RA) use is shown in Table 6. Receive Address (RA) Usage below.

TABLE 6

| Receive Address (RA) Usage | | | | |
|---|---|---|---|---|
| Receiver Address (RA) in a Trigger Frame Header | Recipient of the Trigger Frame | RA in a BAR (Block-Ack Request) | TW TSP termination if the Trigger Frame has "More TF = 0" | Benefit |
| Individual Address | Trigger Frame is received only by the STA | Set to the GCR Address corresponding to the BARs | No effect. Resource Unit (RU) always allocated to the STA | — |

TABLE 6-continued

Receive Address (RA) Usage

| Receiver Address (RA) in a Trigger Frame Header | Recipient of the Trigger Frame | RA in a BAR (Block-Ack Request) | TW TSP termination if the Trigger Frame has "More TF = 0" | Benefit |
|---|---|---|---|---|
| Broadcast Address | Trigger Frame is received by all STAs | | If the Trigger Frame does not allocate RU for a STA, then the TWT SP of the STA is terminated; GCR SP corresponding to a GCR Address is terminated for STAs for which the Trigger Frame does not allocate RU | May terminate legacy TWT SPs and GCR SPs |
| GCR Address | Trigger Frame is received by STAs in the GCR group | | GCR SP of GCR Address is terminated for STAs for which the Trigger Frame does not allocate RU | Reduces the number of receiving STAs |
| MAC Address that is agreed to be common for all GCR Addresses | Trigger Frame is received by all STAs that belong to any GCR group | | GCR SP of GCR Address is terminated for STAs for which the Trigger Frame does not allocate RU | Reduces the number of receiving STA |

Figure 8:
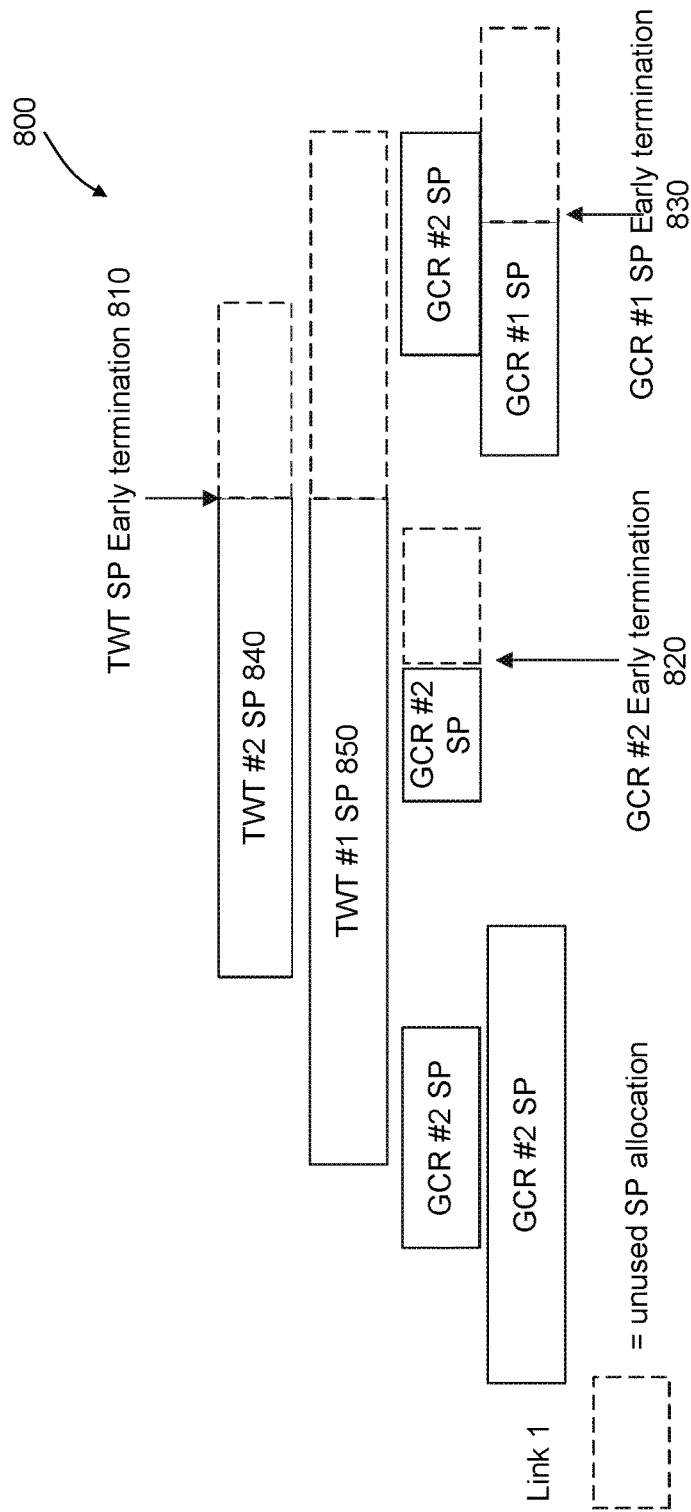
FIG. 8 illustrates an example of GCR-SP management for GCR-MLO with overlapping SPs, according to some embodiments of the disclosure.

FIG. 8 illustrates example 800 of GCR-SP management for GCR-MLO with overlapping SPs, according to some embodiments of the disclosure. For explanation purposes and not a limitation, FIG. 8 may be described with reference to elements from other figures in the disclosure. For example, AP MLD 310 of FIG. 3 may transmit frames within target wake time (TWT) SPs and GCR-SPs that overlap on Link1, e.g., Link2 395 of GCR primary link set 390 of FIG. 3.

Example 800 illustrates TWT #2 SP 840 in which downlink (DL) individually addressed data to a STA (not shown) is transmitted. A STA may receive multiple TWT flows (e.g., TWT #1 SP 850 and TWT #2 SP 840) and each TWT flow may have SPs at a different schedule (e.g., different SP Start time, SP end time and SP interval). Thus, two or more TWT SPs can overlap. All overlapping TWT SPs can be terminated early with the same signaling indication shown in example 800 at TWT SP early termination 810. A GCR-SP carries GCR frames that have the same group address in a destination address field. (See FIG. 9A.) The group address can be associated with a GCR-MLO group, and the group address can be subject to a corresponding GCR-MLO agreement. Each GCR-SP (e.g., GCR #1 SP and GCR #2 SP) is terminated separately (e.g., shown at GCR #2 SP early termination 820 and GCR #1 SP early termination 830) because GCR #1 SP and GCR #2 SP carry different data. Further, a GCR-SP termination does not terminate TWT SPs for individual data.

In some embodiments, STAs may have TWT SPs for individually addressed frames transmission ongoing at the same time as GCR SP. EOSP=1 or MD=0 in the MAC header of MPDU transmitted to a group address terminates only the specific GCR-SP. EOSP=1 or MD=0 in the MAC Header of the individually addressed frame terminates all TWT SPs. Expiration of the GCR-SP duration terminates only that GCR-SP. For example, after GCR #2 Early termination 820 does not affect other GCR-SPs, such a subsequent GCR #2 SP. A trigger frame with the More TF=0 terminates the GCR SPs and Individual SPs of the STAs that did not have allocated RU by the Trigger frame.

Figure 9A:
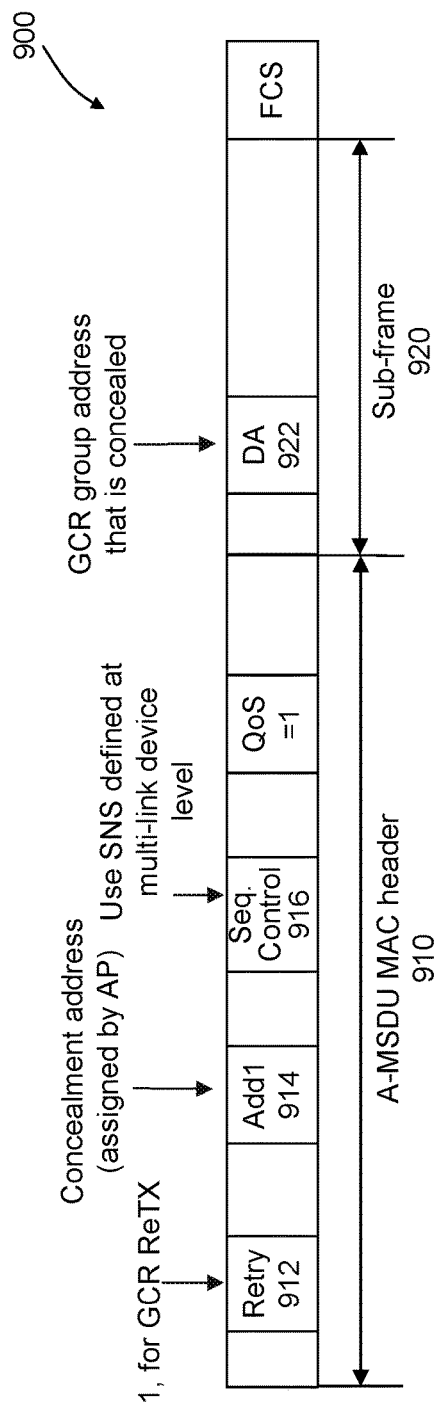
FIG. 9A illustrates an example of GCR frame transmission for GCR-MLO, according to some embodiments of the disclosure.

FIG. 9A illustrates example 900 of a GCR frame transmission for GCR-MLO, according to some embodiments of the disclosure. FIG. 9A may be described with elements from other figures in the disclosure. For example, an AP MLD (e.g., AP MLD 110 of FIG. 1) can transmit example 900 of a GCR frame transmission that can be received by a non-AP MLD (e.g., non-AP MLD 120a-120c of FIG. 1) that is a member of a GCR-MLO group. A GCR frame is a group addressed frame subject to a GCR-MLO agreement between AP MLD 110 and at least one non-AP MLD 120 (e.g., non-AP MLD 120a-120c) within an infrastructure basic service set (BSS) or between peer mesh stations in a mesh BSS.

GCR frame transmission 900 uses an aggregate medium access control (MAC) service data unit (A-MSDU) frame format that includes A-MSDU MAC header 910 and subframe 920. A-MSDU MAC header 910 can include: retry field 912 set to "1" for GCR retransmissions (ReTx); Address1 field 914 can include a concealment address assigned by AP MLD 110. The concealment address prevents GCR frames from being processed by legacy GCR-incapable stations (e.g., legacy non-GCR capable station 140); Sequence Control field 916 can include a Sequence Number Space (SNS) defined at the MLD level (e.g., SNS_GCR-MLO_Unsolicited Retry 360 and SNS_GCR-MLO-BlockAck 365 of FIG. 3A.) Subframe field 920 includes the GCR frame format that includes destination address (DA) field 922. DA field 922 includes the group address that is concealed. The group address can be subject to a GCR-MLO agreement.

GCR frames may be aggregated in an aggregate-MAC protocol data unit (A-MPDU). A-MPDUs include the aggregation of multiple MPDUs, and result in larger transmitted payloads. GCR frames (also called GCR data) may be aggregated similarly as individually addressed data frames by adding A-MPDU headers. A-MPDU aggregation used for GCR data can include a single traffic identifier (TID)

A-MPDU Aggregation. For example, a single TID A-MPDU aggregated payload includes aggregated frames corresponding to a single concealment address (that corresponds to a single group address.) All of these aggregated frames will belong to the same TID (e.g., share a same TID value.) The support for such single-TID aggregation is mandatory for all GCR capable extremely high throughput (EHT) stations (e.g., non-AP MLD 120a-120c.)

Some embodiments include a multi-TID A-MPDU aggregated payload that include aggregated frames from two or more concealment addresses (that correspond to two or more group addresses) within the transmitted PPDU. If multi-TID A-MPDU aggregation is used, then all receivers (e.g., non-AP MLD 120a-120c) are capable of receiving multi-TID A-MPDU aggregation, and AP MLD 110 is capable of transmitting multi-TID A-MPDU aggregation. In some embodiments, AP MLD 110 uses a single indication to indicate its support of transmitting multi-TID A-MPDU of both individually addressed frames and multi-TID A-MPDU of GCR frames. In some embodiments, AP MLD 110 indicates separately (e.g., using two separate indications) AP MLD 110 support of transmitting multi-TID A-MPDU of individually addressed frames and its support of transmitting multi-TID A-MPDU of GCR frames In some embodiments, AP MLD 110 can assign a concealment address to each group address subject to a GCR-MLO agreement. All the receivers of a multi-TID A-MPDU of GCR frames (e.g., non-AP MLD 120a-120c) have established GCR agreements (each corresponding to one GCR concealment address subject to such A MPDU) with AP MLD 110.

Figure 9B:
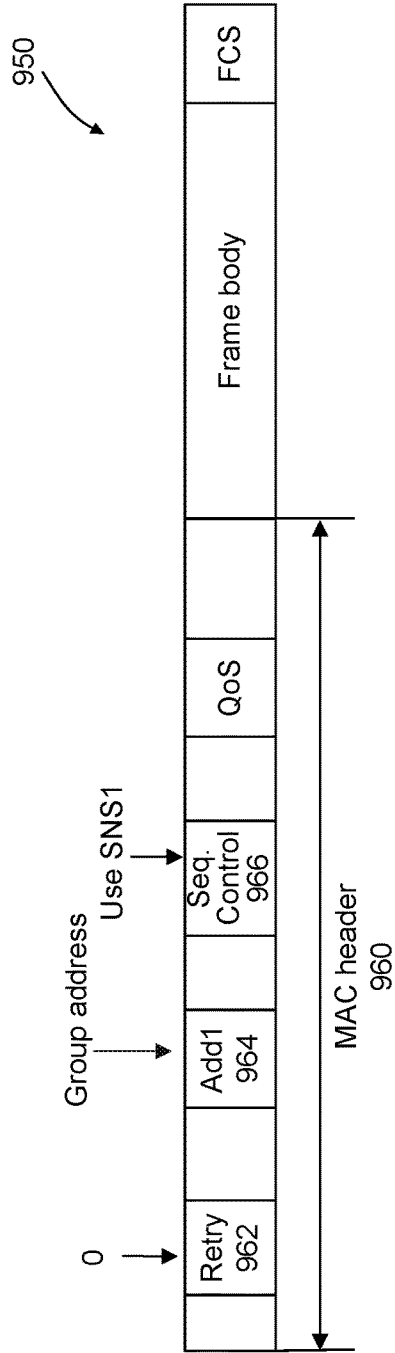
FIG. 9B illustrates an example of a non-GCR frame format, according to some embodiments of the disclosure.

FIG. 9B illustrates example 950 of a non-GCR (e.g., No-Ack/No-Retry) group addressed frame format, according to some embodiments of the disclosure. FIG. 9B may be described with elements from other figures in the disclosure. For example, an AP MLD (e.g., AP MLD 110 of FIG. 1) can transmit example 950 of a no-Ack/no-Retry group addressed frame format that can be received by a legacy non-GCR station (e.g., legacy non-GCR station 140 of FIG. 1) that is also a member of the GCR-MLO group. The no-Ack/no-Retry group addressed frame can be a group addressed frame where the group address is subject to a GCR-MLO agreement between AP MLD 110 and at least one non-AP MLD 120 (e.g., non-AP MLD 120a-120c) within an infrastructure basic service set (BSS) or between peer mesh stations in a mesh BSS.

In some embodiments, frames subject to GCR agreements are also transmitted using no-Ack/no-Retry group addressed frame format if at least one group member does not perform GCR. For example, a GCR-MLO group may include a legacy GCR-incapable station (e.g., legacy non-GCR capable station 140 of FIG. 1.) To accommodate the legacy GCR-incapable station, AP MLD 110 can transmit a no-Ack/no-Retry group addressed frame format illustrated in example 950 across each of the links of AP MLD 110 to serve at least legacy non-GCR capable station 140. Any subsequent GCR frames transmitted by AP MLD 110 include the concealment address that is not recognized by legacy non-GCR capable station 140 (e.g., not passed up to a MAC service access point (SAP) of legacy non-GCR capable station 140.) Example 950, a no-Ack/no-Retry group addressed frame format, can be called a non-GCR group addressed frame format, and includes MAC header 960. MAC header 960 can include retry field 962 set to "0", Address1 field 964 set to the group address which may be the group address of DA 922 of FIG. 9A that is concealed from legacy non-GCR capable station 140. Sequence control field 966 uses SNS1 as described in IEEE P802.11REVme_D0.0.

Figure 10A:
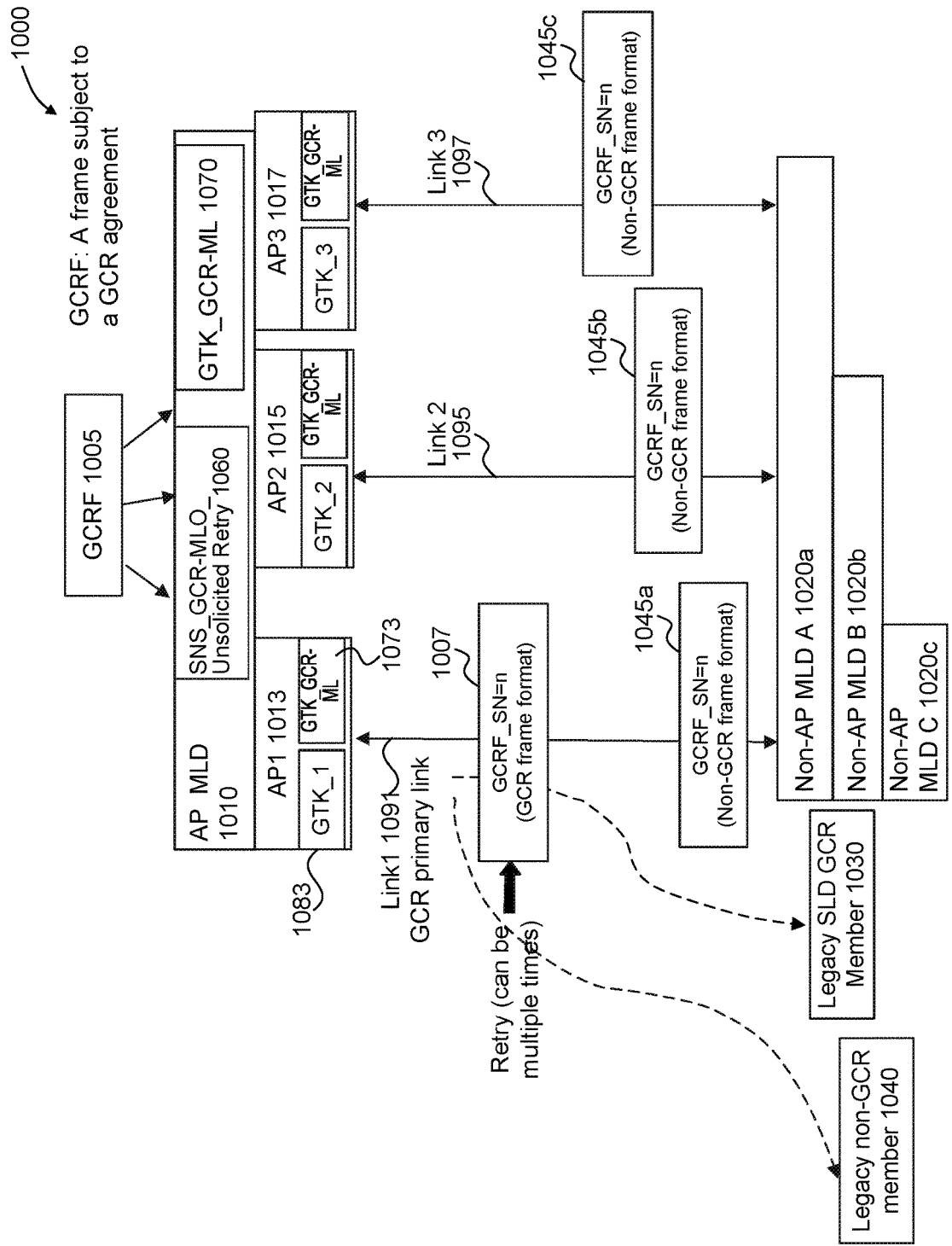
FIG. 10A illustrates an example of GCR-MLO Unsolicited Retry—mode 1, with a legacy non-GCR member, according to some embodiments of the disclosure.

FIG. 10A illustrates example 1000 of GCR-MLO_Unsolicited Retry—mode 1, with a legacy non-GCR member, according to some embodiments of the disclosure. FIG. 10A may be described with reference to elements from other figures in the disclosure. For example, AP MLD 1010 can be AP MLD 110 of FIG. 1 or AP MLD 310 of FIG. 3. AP1 1013, AP3 1015, and AP3 1017 can correspond to AP1 313, AP3 315, and AP3 317. Non-AP MLD A 1020a, non-AP MLD B 1020b, and non-AP MLD C 1020c can correspond to non-AP MLD 120a-120c of FIG. 1 or non-AP MLD 320a-320c of FIG. 3A. Legacy SLD GCR member 1030 and legacy non-GCR member 1040 may correspond respectively, to legacy SLD station 130 and legacy non-GCR capable station 140 of FIG. 1.

Systems operating GCR-MLO_Unsolicited Retry can support backward compatibility with legacy devices. GCR-MLO_Unsolicited Retry operations are possible even when some members of a GCR-MLO group corresponding to a group address has group members that support GCR and some group members that do not support GCR. Frames subject to GCR Unsolicited Retry agreements are also transmitted using a no-Ack/no-Retry frame format if at least one group member does not perform GCR. For example, when a GCR-MLO group (corresponding to one group address and one concealment address) contains (a) GCR-MLO-capable non-AP MLD (e.g., non-AP MLD 120a, 120b, or 120c) and (b) a legacy GCR-incapable station (e.g., legacy non-GCR capable station 140), some embodiments utilize GCR-MLO_Unsolicited Retry as a retransmission policy. The GCR-MLO_Unsolicited Retry group may also include (c) a legacy GCR-SLO-capable station (e.g., legacy SLD station 130.) Copies of the group addressed frames are first transmitted using a no-Ack/no-Retry format (e.g., example 950 of a non-GCR frame format) on each link of the AP MLD 110 that is intended to be received by the legacy GCR-incapable stations 140. Any GCR frames can be transmitted via a GCR primary link (e.g., link1 391 of FIG. 3) or via a link (e.g., link2 395, link 3 397 of FIG. 3) of a GCR primary link set (e.g., GCR primary link set 390.)

For both GCR-MLO Unsolicited Retry and GCR-MLO Block Ack, when a GCR group contains both (a) legacy GCR-SLO-capable stations (e.g., legacy SLD GCR member 1030), and (b) GCR-MLO-capable non-AP MLDs, the legacy GCR-SLO-capable station operates on either the GCR primary link (e.g., link1 1091) or one link (e.g., link2 1095 or link3 1097) of the GCR primary link set (e.g., GCR primary link set 1090), and the following conditions need to be met to enable backward compatibility with legacy GCR-SLO-capable STAs: i) no use of either option of GCR-SLO/MLO AID assignment described in Table 3. AID Assignment Types is not used; ii) use of GCR-MLO agreement setup/update signaling described in paragraphs [0064] and [0065] and iii) option 1 described in Table 1. GCR-MLO Security is used.

For both GCR-MLO_Unsolicited Retry and GCR-MLO Block Ack, when a GCR group contains only GCR-MLO-capable non-AP MLDs, all options described in this disclosure can be used.

In FIG. 10A, a GCR-MLO group includes the following members: non-AP MLD A 1020a, non-AP MLD B 1020b, non-AP MLD C 1020c, legacy SLD GCR member D 1030, and legacy non-GCR member 1040. A GCR-MLO agreement may be established between AP MLD 1010 and each of non-AP MLD A 1020a, non-AP MLD B 1020b, non-AP MLD C 1020*c*. A GCR-SLO agreement may be established between AP MLD 1010 and legacy SLD GCR member D 1030, while no GCR agreement is established with legacy non-GCR member 1040. For mode 1, during the GCRF (GCR frame) delivery times, the GCR-MLO group members are committed to be available on the GCR primary link, link1 1091.

GCRF 1005 refers to a GCR frame that is subject to a GCR agreement (e.g., GCR-MLO). Based on the GCR-MLO group membership, AP MLD 1010 implements GCR-MLO Unsolicited Retry as a retransmission policy for GCRF and determines a number of retry times for GCRF 1005. In addition, AP MLD 1010 determines and assigns a concealment address corresponding to the group address. Since legacy non-GCR member 1040 does not support GCR, AP MLD 1010 transmits GCRF data using a no-Ack/no-Retry group addressedframe format (e.g., example 950 of a non-GCR frame format) on all links of AP MLD 1010 shown as GCRF_SN=n 1045*a* on link1 1091, GCRF_SN=n 1045*b* on link2 1095, GCRF_SN=n 1045*c* on link3 1097, where Address1 field 964 is equal to the group address, and uses the respective GTKs corresponding to the links: GTK_1 1083, GTK_2 1085, GTK_3 1087, and a sequence number assigned from SNS_GCR-MLO_Unsolicited Retry 1060 in Sequence Control field 916.

AP MLD 1010 may retransmit GCRF data Retry GCRF_SN=n 1007 on GCR primary link, link1 1091, using a GCR frame format (as shown in example 900) to legacy SLD GCR member 1030, non-AP MLD A 1020*a*, non-AP MLD B 1020*b*, and non-AP MLD C 1020*c*. The GCR frame format of Retry GCRF_SN=n 1007 can include the concealment address in Address1 field 914, a sequence number assigned from SNS_GCR-MLO_Unsolicited Retry 1060 in Sequence Control field 916, and the group address in DA field 922. Retry GCRF_SN=n 1007 can be retransmitted multiple times, where the number of retry times is set by AP MLD 1010. The GCR frames are transmitted using GTK_GCR-ML 1070

AP MLD 1010 and non-AP MLDs 1020*a*-1020*c* take advantage of their multiple links using the Unsolicited Retry as a retransmission policy for GCRF 1005 by transmitting Retry GCRF_SN=n 1007 in GCR frame format (e.g., example 900 of a GCR frame transmission for GCR-MLO) on non-GCR primary link, link2 1095 or link3 1097 when AP MLD 1010 obtains information that non-AP MLD A 1020*a*, MLD B 1020*b*, or non-AP MLD C is temporarily unavailable on the primary link1 1091, but available on a non-primary link (e.g., link2, 1095 or link3 1097), using GTK_GCR-ML 1073.

Figure 10B:
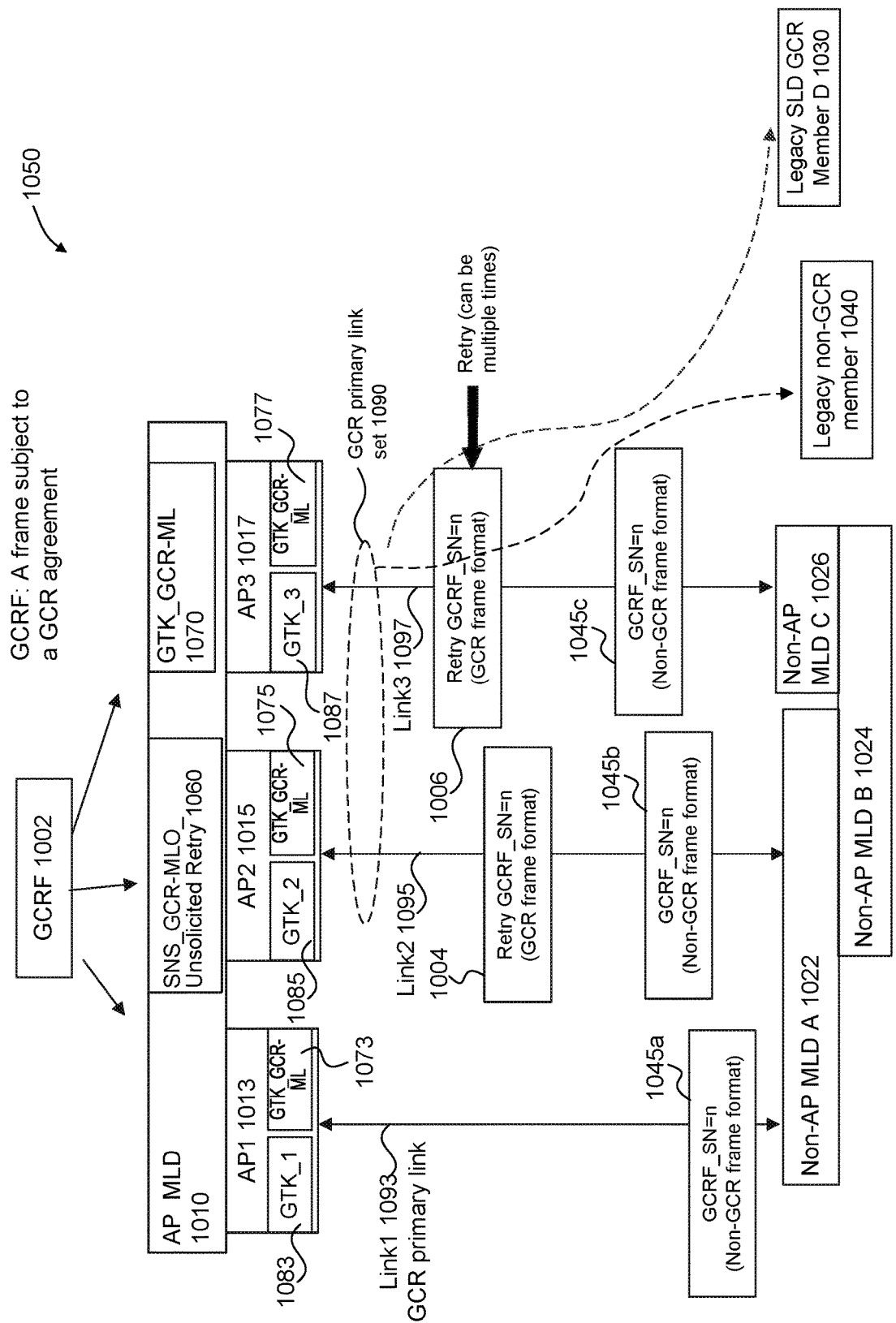
FIG. 10B illustrates an example of GCR-MLO Unsolicited Retry—mode 2, with a legacy non-GCR member, according to some embodiments of the disclosure.

FIG. 10B illustrates example 1050 of GCR-MLO_Unsolicited Retry—mode 2, with a legacy non-GCR member, according to some embodiments of the disclosure. FIG. 10B may be described with reference to elements from other figures in the disclosure. For example, AP MLD 1010 can be AP MLD 110 of FIG. 1 or AP MLD 310 of FIG. 3. AP1 1013, AP3 1015, and AP3 1017 can correspond to AP1 313, AP3 315, and AP3 317. Non-AP MLD A 1022, non-AP MLD B 1024, and non-AP MLD C 1026 can correspond to non-AP MLD 120*a*-120*c* of FIG. 1 or non-AP MLD 320*a*-320*c* of FIG. 3A. Legacy SLD GCR member 1030 and legacy non-GCR member 1040 may correspond respectively, to legacy SLD station 130 and legacy non-GCR capable station 140 of FIG. 1.

Example 1000 focused on mode 1; example 1050 is similar, but focuses on mode 2. In example 1050, a GCR-MLO group includes the following members: non-AP MLD A 1022, non-AP MLD B 1024, non-AP MLD C 1026, legacy SLD GCR member D 1030, and legacy non-GCR member 1040. A GCR-MLO agreement may be established between AP MLD 1010 and each of non-AP MLD A 1022, non-AP MLD B 1024, non-AP MLD C 1026. A GCR-SLO agreement may be established between AP MLD 1010 and legacy SLD GCR member D 1030, while no GCR agreement is established with legacy non-GCR member 1040.

In example 1050, GCRF 1002 refers to a GCR frame that is subject to a GCR agreement (e.g., GCR-MLO). Based on the GCR-MLO group membership, AP MLD 1010 implements GCR-MLO_Unsolicited Retry as a retransmission policy for GCRF and determines a number of retry times for GCRF 1002. In addition, AP MLD 1010 determines and assigns a concealment address corresponding to the group address. For mode 2, during the GCRFs (GCR frames) delivery times, the GCR-MLO group members are committed to be available on at least one link (e.g., link2 1095 and/or link3 1097) within the GCR primary link set 1090. In some embodiments, if GCR-MLO group members converge to a single link of GCR primary link set 1090, then example 1050 transitions to mode 1.

Since legacy non-GCR member 1040 does not support GCR, AP MLD 1010 transmits GCRF data using a non-GCR frame format (e.g., example 950 of a non-GCR frame format) on all links of AP MLD 1010 shown as GCRF_SN=n 1045*a* on link1 1093, GCRF_SN=n 1045*b* on link2 1095, GCRF_SN=n 1045*c* on link3 1097, where Address1 field 964 is equal to the group address, and using the respective GTKs corresponding to the links: GTK_1 1083, GTK_2 1085, GTK_3 1087.

AP MLD 1010 may retransmit GCRF data (e.g., Retry GCRF_SN=n (GCR frame format) 1004 and 1006) on all links (e.g., link2 1095 and link3 1097), of GCR primary link set 1090, using a GCR frame format to legacy SLD GCR member 1030, non-AP MLD A 1022, non-AP MLD B 1024 and non-AP MLD C 1026). The GCR frame format is similar to example 900 in that an Address1 field would include the concealment address corresponding to the group address and a DA field would include the group address. The GCR-SLO frame format Sequence Control field, however, would use SNS1 (explained in IEEE P802.11REVme.) The GCRF data in the GCR-SLO frame format can be retransmitted multiple times, where the number of retry times is set by AP MLD 1010. The GCR frame formats of Retry GCRF_SN=n 1004 and Retry GCRF_SN=n 1006 can include the concealment address in Address1 field 914, a sequence number assigned from SNS_GCR-MLO_Unsolicited Retry 1060 in Sequence Control field 916, and the group address in DA field 922. Retry GCRF_SN=n 1004 and Retry GCRF_SN=n 1006 can be retransmitted multiple times, where the number of retry times is set by AP MLD 1010. The GCR frames are transmitted using GTK_GCR-ML 1070.

AP MLD 1010 and non-AP MLDs 1022, 1024, 1026 take advantage of their multiple links using the Unsolicited Retry as a retransmission policy for GCRF 1002 by transmitting Retry GCRF_SN=n 1004 and Retry GCRF_SN=n 1006 on a link that does not belong to the primary link set in GCR frame format (e.g., example 900 of a GCR frame transmission for GCR-MLO), when AP MLD 1010 obtains information that non-AP MLD A 1021*a*, MLD B 1024, or non-AP MLD C 1026 is temporarily unavailable on a link of the primary link set 1090 but available on a link that is not of a primary link set (e.g., link1, 1093), using GTK_GCR-ML 1070.

Table 7. GCR-MLO: Unsolicited Retry—Mode 1 & 2 summarizes the transmission types described above. If all members of a GCR-MLO group are non-AP MLDs (e.g., EHT/11be capable) and option 1 of the GCR-SLO/MLO AID assignment described in Table 3. AID Assignment Types is used, then an AID$_{GCR}$ assigned to a GCR group uniquely identifies the GCR group (corresponding to a group address), the concealment address for this GCR group may not be generated by the AP MLD and transmitted to the group members during the GCR agreement setup. Instead, the frame format of No-Ack/No-Retry transmission of group address frames, may be used for GCR transmission instead of the GCR frame format.

313, AP3 315, and AP3 317. Non-AP MLD A 1120a, non-AP MLD B 1120b, and non-AP MLD C 1120c can correspond to non-AP MLD 120a-120c of FIG. 1 or non-AP MLD 320a-320c of FIG. 3A. Legacy SLD GCR member D 1130 may correspond to legacy SLD GCR member 130 of FIG. 1.

Figure 11A:
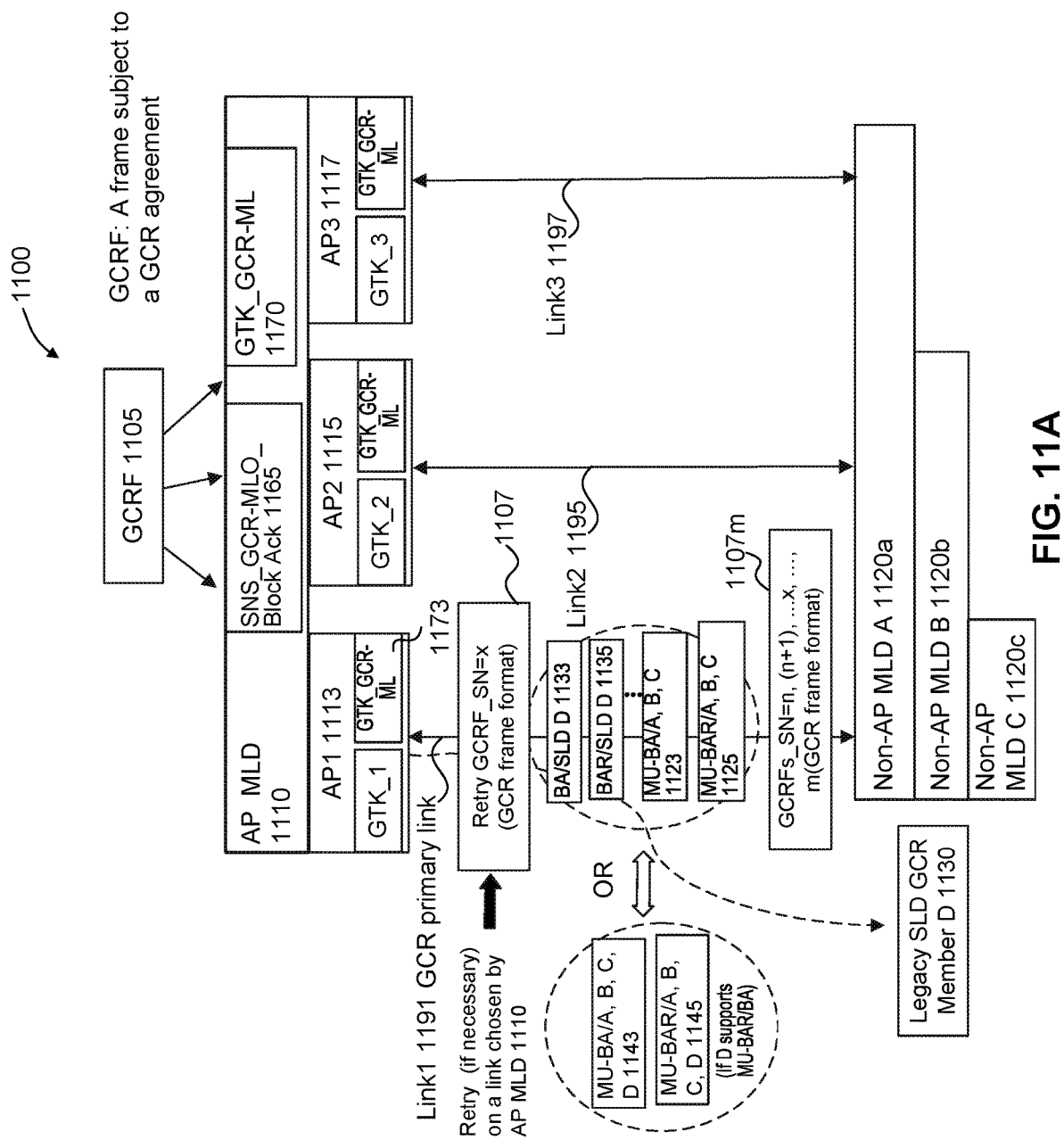
FIG. 11A illustrates an example of GCR-MLO Block Ack—mode 1, with a legacy single link device (SLD) GCR member, according to some embodiments of the disclosure.

FIG. 11A illustrates example 1100 of GCR-MLO Block Ack—mode 1, with a legacy SLD GCR member, according to some embodiments of the disclosure. Assume a GCR-MLO group includes the following members: non-AP MLD

TABLE 7

GCR-MLO: Unsolicited Retry - Mode 1 & 2

| Tx Type | Delivery Method | Tx Time | Tx Link | Frame Format | SNS | Group Key |
|---|---|---|---|---|---|---|
| No-Ack/No-Retry transmission | Non-GCR-SP | The DTIM Beacon before the GCRF delivery | All links | Frame format of No-Ack/No-Retry transmission of group addressed frames | SNS_GCR-MLO_un-solicited retry (defined at ML level) | GTK_link_i |
| | GCR-SP | The DTIM beacon before or after the GCRF delivery in SPs | | | | |
| GCR-transmission | Non-GCR-SP | Immediately after a DTIM Beacon after the delivery of no-Ack/no-retry copy of the same frames | Nominally, transmit on the primary link (as in mode 1) or primary link set (as in mode 2) Optionally, transmits on the links that are not primary link or link set due to temporary unavailability of one or more non-AP MLD(s) on the primary link or link set. | GCR frame format (the same as GCR-SLO frame format depicted), with "SNS_GCR-MLO_unsolicited retry", instead of SNS1, being used to generate the sequence number contained in the "sequence control" field. | | GTK_GCR-ML |
| | GCR-SP | During the GCR Service Periods | | | | |

GCR-MLO Block Ack in mode 1 & 2 can be established when all members of a group corresponding to a group address support GCR. During the GCR agreement set up, an AP MLD establishes a GCR primary link (mode 1) or links of the GCR primary link set (mode 2). During the GCRF delivery times, the GCR member STAs are committed to be available on the GCR primary link or a link of the GCR primary link set. If a GCR-MLO group includes a legacy GCR-SLD member (e.g., legacy SLD GCR member 1130), the legacy GCR-SLD member operates operate on either the GCR primary link (mode 1) or one link of the GCR primary link set (mode 2), and the following are met to ensure backwards compatibility with legacy GCR-SLO-capable STAs FIG. 11A illustrates example 1100 of GCR-MLO Block Ack—mode 1, with a legacy single link device (SLD) GCR member, according to some embodiments of the disclosure. FIG. 11A may be described with reference to elements from other figures in the disclosure. For example, AP MLD 1110 can be AP MLD 110 of FIG. 1 or AP MLD 310 of FIG. 3. AP1 1113, AP3 1115, and AP3 1117 can correspond to AP1

A 1120a, non-AP MLD B 1120b, non-AP MLD C 1120c, and legacy SLD GCR member D 1130. A GCR-MLO agreement may be established between AP MLD 1110 and each of non-AP MLD A 1120a, non-AP MLD B 1120b, non-AP MLD C 1120c. A GCR-SLO agreement may be established between AP MLD 1110 and legacy SLD GCR member D 1130. In addition, all of the GCR-MLO group members establish a GCR BA agreement with AP MLD 1110. For mode 1, during the GCRF (GCR frame) delivery times, the GCR-MLO group members are committed to be available on the GCR primary link, link1 1191.

AP MLD 1110 can transmit initial GCR frames, GCRFs_SN=n, (n+1), . . . x . . . m, 1107 using the GCR frame format. The transmission nominally, is on the GCR primary link (e.g., link1 1191) for mode 1 or on a link (e.g., link2 1195 or link3 1197) of the GCR primary link set (e.g., GCR primary link set 1190 of FIG. 11B) for mode 2. The GCR frame format of GCRFs GCRF_SN=n, (n+1), . . . x, . . . m, 1107 can include the concealment address in Address1 field 914, a sequence number assigned from SNS_GCR-MLO Block Ack 1165 in Sequence Control field 916, and the group address in DA field 922.

In some embodiments, AP MLD 1110 can perform the initial GCR transmission on the links (e.g., link2 1195 or link3 1197) that are not the GCR primary link or not a link (e.g., link1 1193 of FIG. 11B) of the GCR primary link set due to a temporary unavailability of one or more non-AP MLD(s) on the GCR primary link or a link of the GCR primary link set. AP MLD 1110 and non-AP MLDs 1120a-1120c take advantage of their multiple links using the BlockAck Retry as a retransmission policy. AP MLD 1110 can perform a retransmission on a link (a GCR primary link, a link of the GCR primary link set, or otherwise) that AP MLD 1110 selects based on but not limited to: a BlockAck bitmap from each member; a missing BlockAck frame; and/or a member's availability on various links.

Example 1100 shows that after the initial transmission GCRFs GCRF_SN=n, (n+1), , , , x, . . . m, 1107, AP MLD 1110 transmit a BAR (Block-Ack Request) frame to each of the members, non-AP MLD A 1120a, non-AP MLD B 1120b, non-AP MLD C 1120c, and legacy SLD GCR member D 1130. Based on the Ack frame received from these GCR group members, AP MLD 1110 learns that the GCR frame with the sequence number (SN) that is equal to x (e.g., Retry GCRF_SN=x (GCR frame format) 1107 needs to be retransmitted on link1 1191. The GCR frame format of GCRF_SN=n, (n+1), . . . x, . . . m, 1107 and GCRF Retry GCRF_SN=x 1107 can include example 900 of a GCR frame transmission for GCR-MLO using GTK_GCR-ML 1170, and can include the concealment address in Address1 field 914, a sequence number assigned from SNS_GCR-MLO Block Ack 1165 in Sequence Control field 916, and the group address in DA field 922.

If all the members including legacy SLD GCR member D 1130 support multi-user (MU)-BlockAckReq/BlockAck (BAR/BA) exchange, then AP MLD 1110 can transmit a MU-BAR/A, B, C, D 1145 identifying non-AP MLD A 1120a, non-AP MLD B 1120b, non-AP MLD C 1120c, and legacy SLD GCR member D 1130, and can receive a corresponding BA response shown as MU-BA/A, B, C, D 1143. In the event legacy SLD GCR member D 1130 does not support MU-BARBA, AP MLD 1110 can transmit and receive separate BAR/BA exchanges shown as: MU-BAR/A, B, C 1125; MU—BA/A, B, C 1123; and BAR/SLD D 1135 and BA/SLD D 1133. Other GCRF retransmissions are shown as GCRFs_SN 1107m.

Figure 11B:
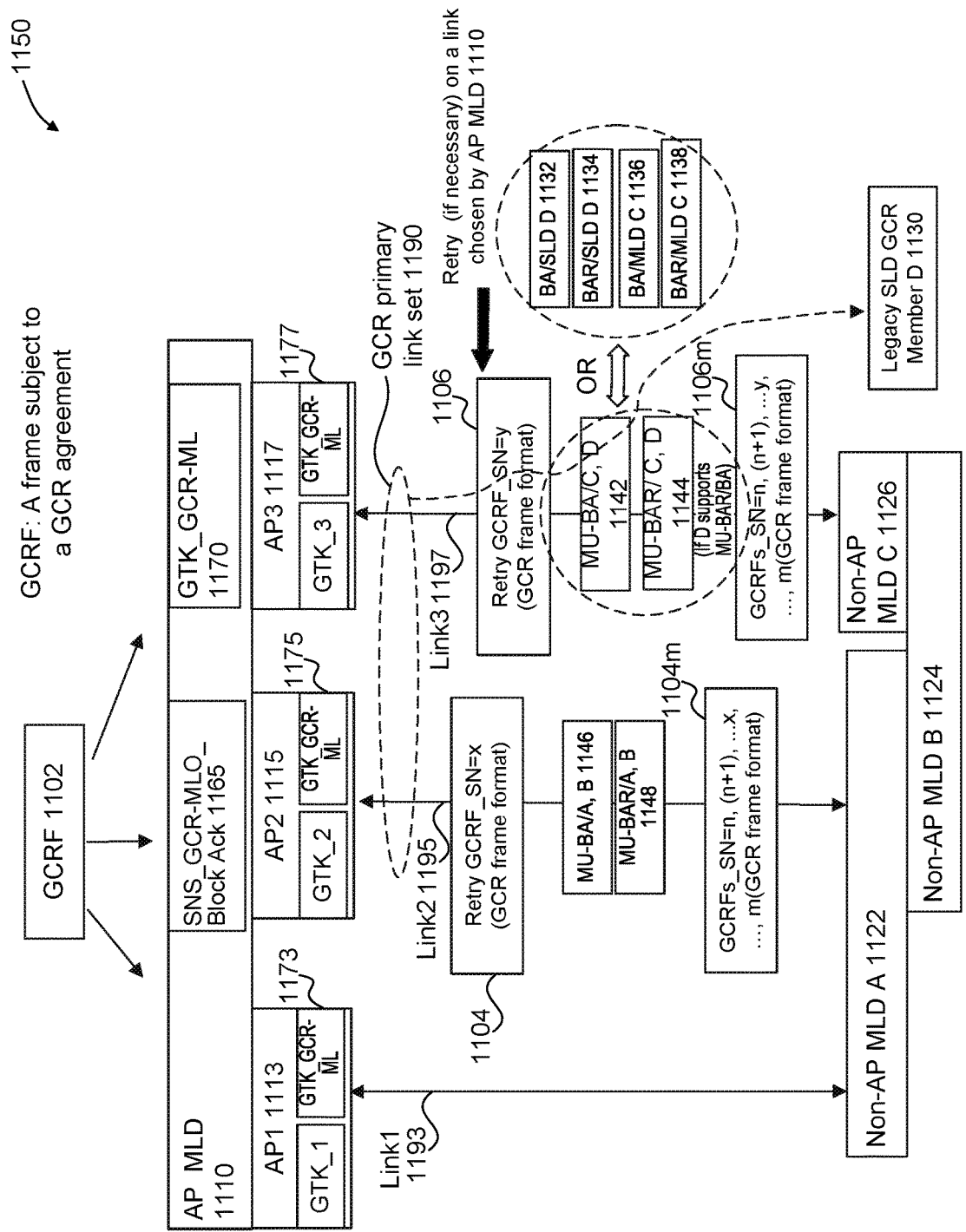
FIG. 11B illustrates an example of GCR-MLO Block Ack—mode 2, with a legacy SLD GCR member, according to some embodiments of the disclosure.

FIG. 11B illustrates example 1150 of GCR-MLO Block Ack—mode 2, with a legacy SLD GCR member, according to some embodiments of the disclosure. FIG. 11B illustrates an example of GCR-MLO Block Ack—mode 2, with a legacy SLD GCR member, according to some embodiments of the disclosure. FIG. 11B may be described with elements from other figures in the disclosure. For example, AP MLD 1110 can be AP MLD 110 of FIG. 1 or AP MLD 310 of FIG. 3. AP1 1113, AP3 1115, and AP3 1117 can correspond to AP1 313, AP3 315, and AP3 317. Non-AP MLD A 1122, non-AP MLD B 1124, and non-AP MLD C 1126 can correspond to non-AP MLD 120a-120c of FIG. 1 or non-AP MLD 320a-320c of FIG. 3A. Legacy SLD GCR member D 1130 may correspond to legacy SLD GCR member 130 of FIG. 1.

Assume a GCR-MLO group includes the following members: non-AP MLD A 1122, non-AP MLD B 1124, non-AP MLD C 1126, and legacy SLD GCR member 1130. A GCR-MLO agreement may be established between AP MLD 1110 and each of non-AP MLD A 1122, non-AP MLD B 1124, and non-AP MLD C 1126. A GCR-SLO agreement may be established between AP MLD 1110 and legacy SLD GCR member D 1130. In addition, all of the GCR-MLO group members establish a GCR BA agreement with AP MLD 1110. For mode 2, during the GCRFs (GCR frames) delivery times, the GCR-MLO group members are committed to be available on at least one link (e.g., link2 1195 or link3 1197) of GCR primary link set 1190.

Example 1150 shows that after the initial transmission of GCRF_SN=n, (n+1), . . . x, . . . m 1104 on link 2 1995 and 1106 on link 3, using GCR frame format, AP MLD 1110 transmits BAR (Block Ack Request) frame to each of the members, non-AP MLD A 1122, non-AP MLD B 1124, non-AP MLD C 1126, and legacy SLD GCR member D 1130. Based on the Ack frame received from these GCR group members, AP MLD 1110 learns that the GCR frame with the sequence number x (e.g., Retry GCRF_SN=x (GCR frame format) 1104 needs to be retransmitted on link 2 1195 and the GCR frame with the sequence number y (e.g., Retry GCRF_SN=x (GCR frame format) 1106 needs to be retransmitted on link 3 1197. The GCR frame format of GCRF_SN=n, (n+1), . . . x, . . . m 1104, GCRF Retry GCRF_SN=x 1104 and GCRF Retry GCRF_SN=y 1106 can include example 900 of a GCR frame transmission for GCR-MLO using GTK_GCR-ML 1170, and can include the concealment address in Address1 field 914, a sequence number assigned from SNS_GCR-MLO Block Ack 1165 in Sequence Control field 916, and the group address in DA field 922.

If all the members including legacy SLD GCR member D 1130 support multi-user (MU)-BlockAckReq/BlockAck (BAR/BA) exchange, then AP MLD 1110 can transmit on link3 1197, MU-BAR/C, D 1144 identifying non-AP MLD C 1126 and legacy SLD GCR member D 1130, and can receive a corresponding BA response shown as MU-BA/C, D 1142.

In the event legacy SLD GCR member D 1130 does not support MU-BAR/BA, AP MLD 1110 can transmit and receive separate BAR/BA exchanges on link3 1197 shown as: BAR/SLD D 1134 and BA/SLD 1132; and single user (SU)-BAR/C 1138 and BA/C 1136. Other GCRF retransmissions are shown as GCRFs_SN 1106m.

AP MLD 1110 can transmit on link2 1195, MU-BAR/A, B 1148 identifying non-AP MLD A 1122 and non-AP MLD B 1124, and can receive a corresponding BA response shown as MU-BA/A, B 1146. Other GCRF retransmissions are shown as GCRFs_SN 1104m.

Table 8. GCR-MLO: Block Ack—Mode 1 & 2 summarizes the discussions above. If all members of a GCR-MLO group are non-AP MLDs (e.g., EHT/11be capable) and option 1 of the GCR-SLO/MLO AID assignment described in Table 3. AID Assignment Types is used, then an AID$_{-GCR}$ assigned to a GCR group uniquely identifies the GCR group (corresponding to a group address), the concealment address for this GCR group may not be generated by the AP MLD and transmitted to the group members during the GCR agreement setup. Instead, the frame format of No-Ack/No-Retry transmission of group address frames, may be used for GCR transmission instead of the GCR frame format.

TABLE 8

GCR-MLO: Block Ack - Mode 1 & 2

| Tx Type | Delivery Method | Tx Time | Tx Link | Frame Format | SNS | Group Key |
|---|---|---|---|---|---|---|
| No-Ack/No-Retry Tx | | | Not used | | | |
| GCR-Tx | Non-GCR-SP | Immediately after a DTIM Beacon | Initial tx: Nominally, is on the GCR primary link (as in mode 1) or a link of the GCR primary link set (as in mode 2) Optionally, transmits on the links that are not the GCR primary link or a link of the GCR primary link set due to temporary unavailability of one or more non-AP MLD(s) on the GCR primary link or a link of the GCR primary link set. Retransmission: On a link (primary link or otherwise) that AP MLD selects based on: BlockAck bitmap from each member. Missing BlockAck frame Member's availability on various links | GCR frame format (e.g., GCR-SLO frame format with "SNS_GCR-MLO_block ack", instead of SNS1, being used to generate the sequence number contained in the "sequence control" field | SNS_GCR-MLO_block ack (defined at ML level) | GTK_GCR-ML |
| | GCR-SP | During the GCR Service Periods | | | | |

Figure 12:
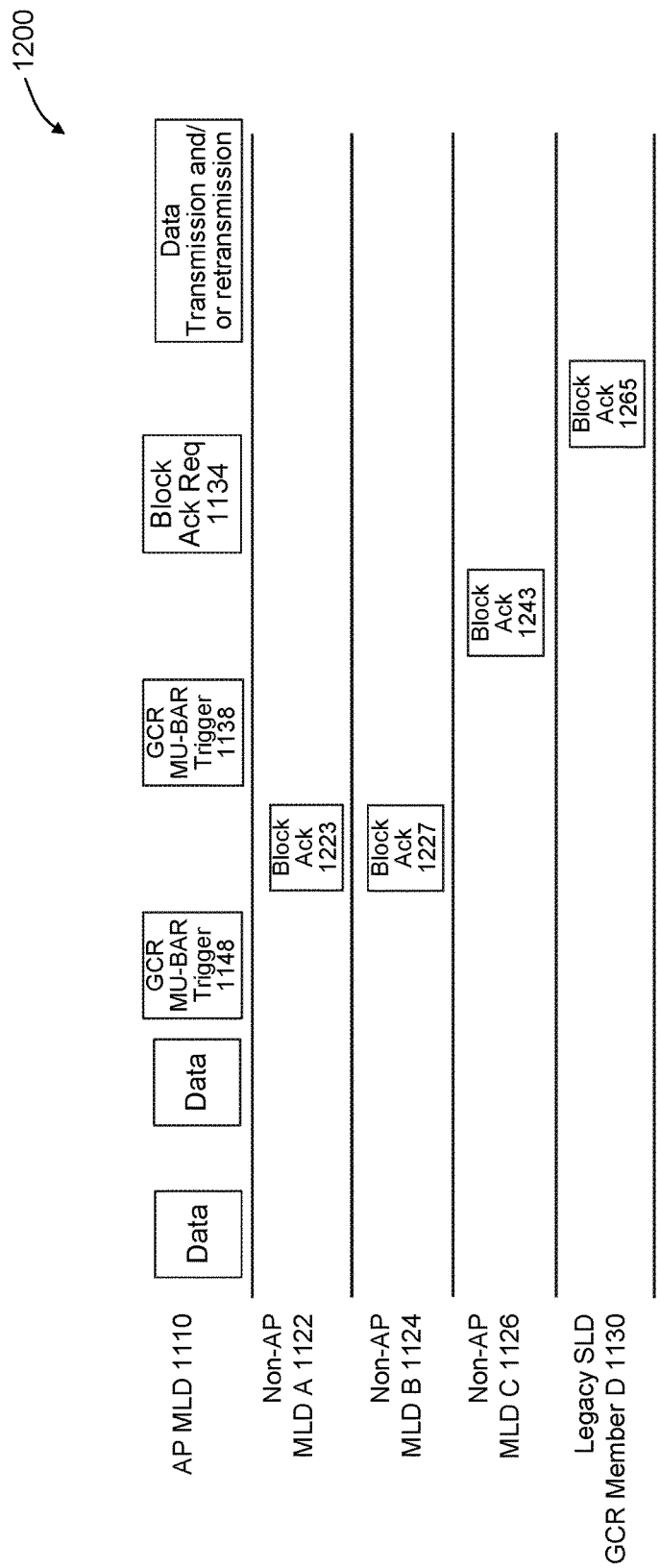
FIG. 12 illustrates an example of a frame exchange with GCR multi-user (MU)-Block Ack Request (BAR) for GCR-MLO, according to some embodiments of the disclosure.

FIG. 12 illustrates example 1200 of a frame exchange with GCR multi-user (MU)-Block Ack Request (BAR) for GCR-MLO, according to some embodiments of the disclosure. As a convenience and not a limitation, FIG. 12 may be described with reference to elements from other figures in the disclosure. For example, example 1200 may include elements from FIG. 11B such as AP MLD 1110, non-AP MLD A 1122, non-AP MLD B 1124, non-AP MLD C 1126, and legacy SLD GCR member D 1130.

When a GCR-MLO agreement is established, AP MLD 1110 can immediately initiate a Block negotiation with the non-AP STAs of the group. For a GCR BlockAckReq Variant, TID_INFO=0 as described in IEEE P802.11REVme. To unify the Block Ack operation for unicast and group cast, some embodiments allow the GCR BlockAckReq to be TID specific (e.g., TID_INFO is not always 0): Option 1: revise the existing GCR BlockAckReq variant. Option 2: create a new GCR BlockAckReq variant, with exemplary name such as "TID-specific GCR BlockAckReq variant." For both Option 1 and Option 2 above, the new GCR BlockAckReq variant is capable of using a single BlockAckReq to request Block Ack for multiple TIDs.

Example 1200 illustrates AP MLD 1110 transmitting data and subsequently transmitting GCR MU-BAR Trigger 1148 corresponding to non-AP MLD A 1122 and non-AP MLD B 1124. Non-AP MLD A 1122 and non-AP MLD B 1124 respond with respective Block Acks 1223 and 1227. If legacy SLD GCR member D 1130 does not support GCR MU-BAR, AP MLD 1110 can transmit a GCR MU BAR Trigger 1138 corresponding to non-AP MLD C 1126, where GCR MU BAR Trigger 1138 only allocates RU to a non-AP MLD C 1126. Non-AP MLD C 1126 can respond with respective Block Ack 1243. AP MLD 1110 can transmit a single user (SU) Block Ack Req 1134 corresponding to legacy SLD GCR member D 1130. Legacy SLD GCR member D 1130 can respond with Block Ack 1265. Based on the received Block Acks, AP MLD 1110 determines whether additional retransmissions are needed.

Figure 13:
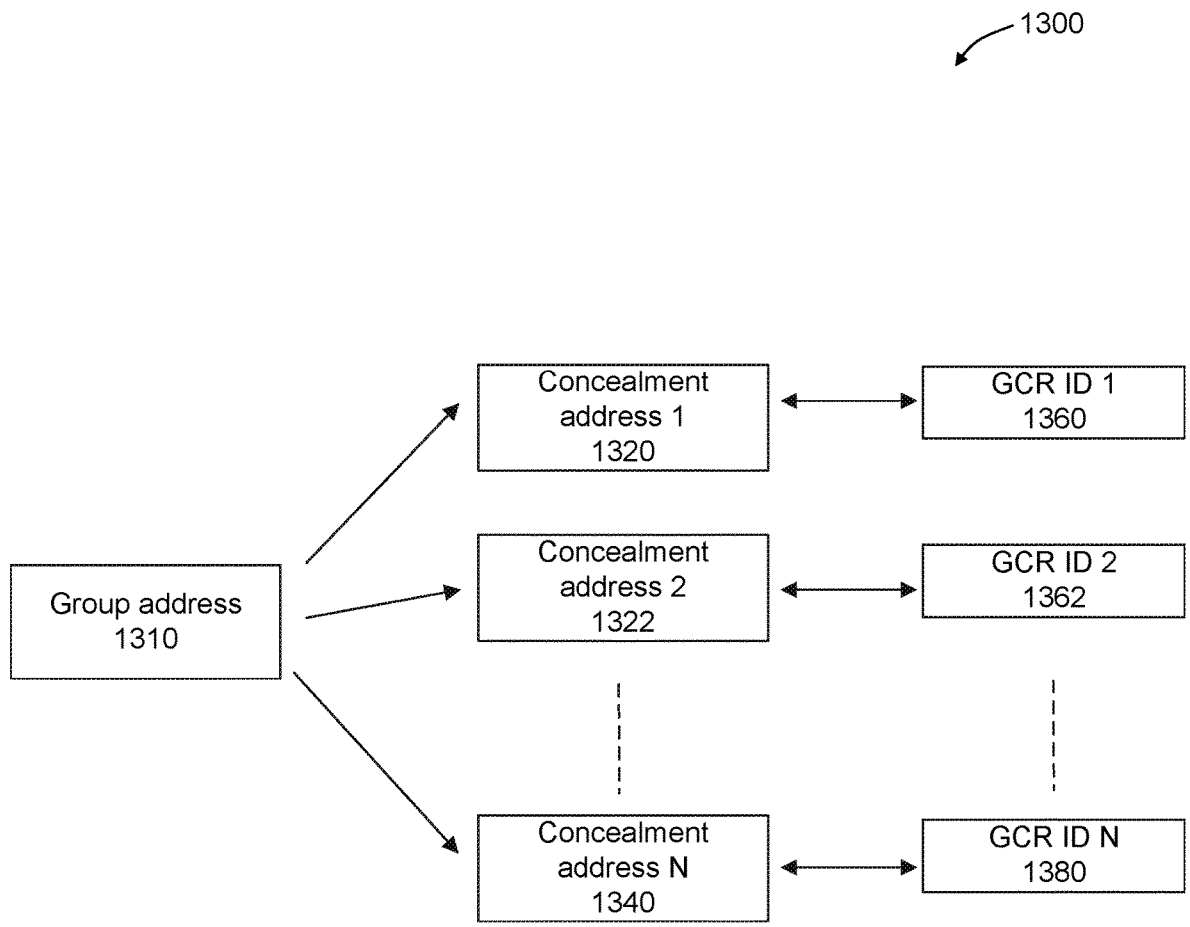
FIG. 13 illustrates an example of creating multiple GCR subgroups that correspond to one single group address, according to some embodiments of the disclosure.

FIG. 13 illustrates example 1300 of creating multiple GCR subgroups that correspond to one single group address, according to some embodiments of the disclosure. As a convenience and not a limitation, FIG. 13 may be described with reference to elements from other figures in the disclosure. For example, AP MLD 110 of FIG. 1 or processor(s) 265 of system 200 of FIG. 2 that executes instructions stored in memory 285 can perform the functions described in example 1300. In some embodiments, all group members corresponding to a group address support GCR-MLO, and AP MLD 110 can map one group address 1310 to one or more concealment addresses concealment address 1 1320, concealment address 2 1322, . . . concealment address N 1340, where N is an integer greater than 1. A concealment address (e.g., concealment address 1 1320 can correspond to a GCR sub-group identified by a GCR Group ID (e.g., GCR ID1 1360, GCR ID 2 1362, . . . GCR ID N 1380.) Further, Concealment address_x can be used for duplicate detection (e.g., duplicate frame.) Each GCR sub-group (e.g., GCR ID 2 1362) may use a corresponding separate GTK_GCR-ML (sub-group n).

Figure 14:
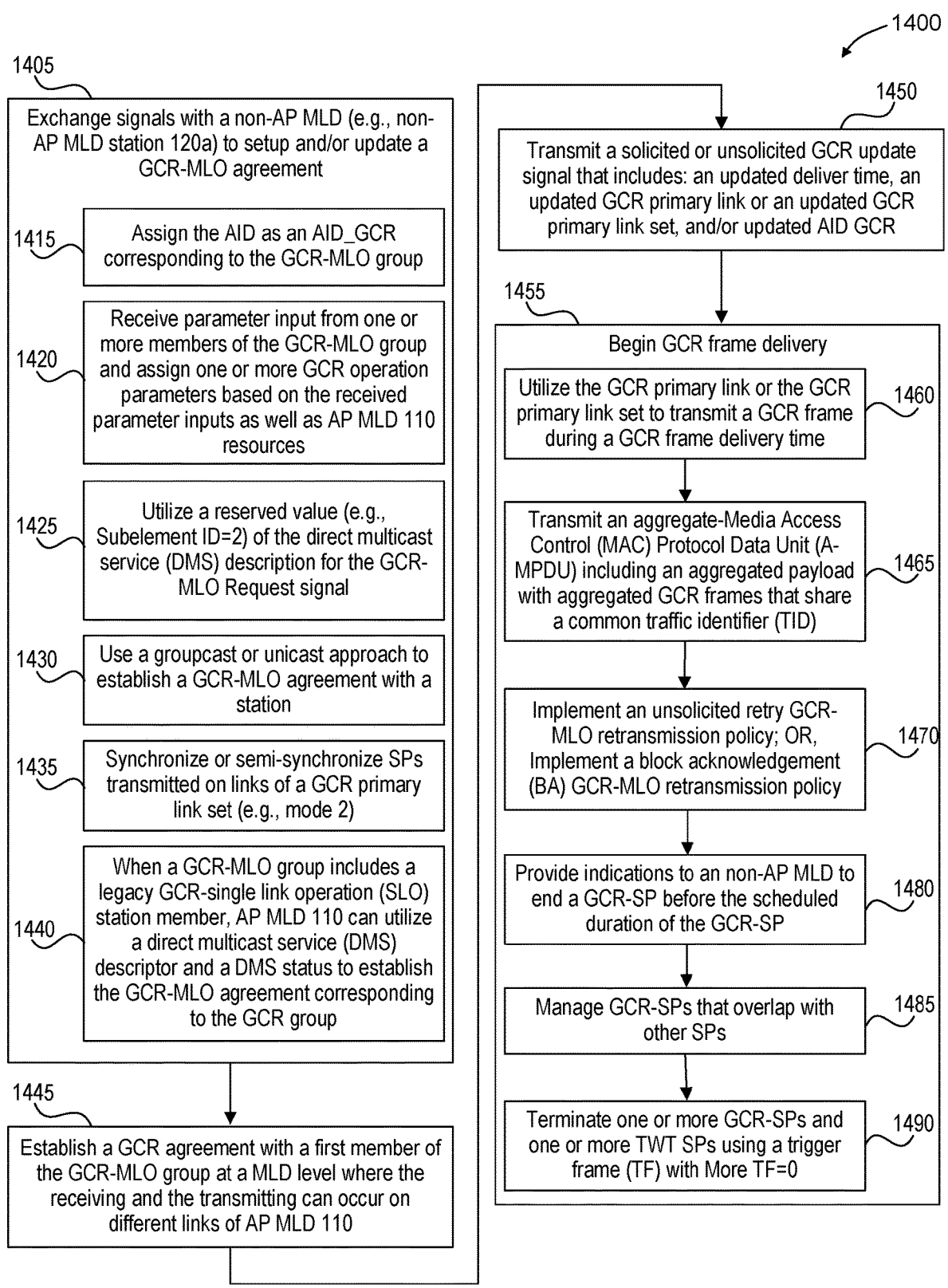
FIG. 14 illustrates an example method for an access point (AP) multi-link device (MLD) for GCR-MLO, according to some embodiments of the disclosure.

FIG. 14 illustrates an example method 1400 for an access point (AP) multi-link device (MLD) for GCR-MLO service, according to some embodiments of the disclosure. As a convenience and not a limitation, method 1400, can be described with reference to elements of other figures in the disclosure. For example, method 1400 can be performed by AP MLD 110 of FIG. 1, or processor(s) 265 of system 200 of FIG. 2 that executes instructions stored in memory 285.

At 1405, AP MLD 110 exchanges signals with a non-AP MLD (e.g., non-AP MLD station 120*a*) to setup and/or update a GCR-MLO agreement. In some embodiments, AP MLD 110 can transmit a signal advertising the availability of a GCR-MLO service for a group address (e.g., a group address that can be subject to the GCR-MLO agreement), and a GCR primary link or a GCR primary link set of the AP MLD. AP MLD 110 can receive a signal including the group address, and the GCR primary link or the GCR primary link set. In response to the receiving, AP MLD 110 can transmit to non-AP MLD 120*a*, the GCR-MLO group address, the GCR primary link or the GCR primary link set, and an association identifier (AID) that corresponds to the group address. Some functions of signals exchanged are described in 1415, 1420, 1425, 1430, 1435, and 1440 and the order of the functions may vary.

At 1415, AP MLD 110 can assign the AID as an $AID_{\_GCR}$ corresponding to the GCR-MLO group. AP MLD 110 can allocate a resource unit (RU) according to the $AID_{\_GCR}$ corresponding to a GCR frame of the group address. In some embodiments, the AID is common among all GCR groups.

At 1420, AP MLD 110 can receive parameter input (e.g., a request for certain parameters to be set at a value) from one or more members of the GCR-MLO group and assign one or more GCR operation parameters based on the received parameter inputs as well as AP MLD 110 resources. For example, AP MLD 110 can receive from a first member of the GCR-MLO group a first parameter (e.g., request GCR-SP duration of 3 msec) in a GCR-MLO Request signal, and based at least on the first parameter and input from another member of the group address, assign a GCR operation parameter (e.g., assign a GCR-SP duration of 5 msec) that is different than the first parameter. AP MLD 110 can then transmit to the first member the GCR operation parameter in a GCR-MLO Response signal.

At 1425, AP MLD 110 can utilize a reserved value (e.g., Subelement ID=2) of the direct multicast service (DMS) status for the GCR-MLO Response frames. For example, AP MLD 110 can contain a GCR-MLO parameters including the group address, and the GCR primary link or the GCR primary link set, and the AID that corresponds to the group address in an subelement of the DMS Status where the subelement ID uses a reserved value (e.g., subelement ID=2) in REVme_D0.0.

At 1430, AP MLD 110 can use a broadcast, groupcast or unicast approach to establish a GCR-MLO agreement with a station. For example, AP MLD 110 can transmit the SP schedule information using a broadcast or groupcast frame. In another example, AP MLD 110 can transmit the SP schedule information using a unicast frame. In some embodiments, the SP established using broadcast frames includes a broadcast target wake time (TWT) element that can include the group address corresponding to the GCR-MLO group, the corresponding concealment address, and/or an identifier of the GCR-MLO group (e.g., a GCR-MLO group ID) corresponding to the GCR-MLO agreement. When the GCR-SP is used for low latency service, AP MLD 110 can modify a restrictive TWT (rTWT) SP establishment method to establish GCR-MLO SP. In some embodiments, 1430 can occur any time after 1425.

At 1435, AP MLD 110 can synchronize or semi-synchronize SPs transmitted on links of a GCR primary link set (e.g., mode 2.) For example, when the group address corresponds to the GCR primary link set, AP MLD 110 can synchronize or semi-synchronize SPs on the links of the GCR primary link set.

At 1440, when a GCR-MLO group includes a legacy GCR-single link operation (SLO) station member, AP MLD 110 can utilize a DMS status to establish the GCR-MLO agreement corresponding to the group address. For example, AP MLD 110 can contain GCR-MLO parameters including the group address, and the GCR primary link or the GCR primary link set, and the AID that corresponds to the group address in an subelement of the DMS Status where the subelement ID is a reserved value (e.g., subelement ID=2) in REVme_D0.0.

At 1445, AP MLD 110 can establish a GCR-MLO agreement with a first member of the GCR-MLO group at a MLD level where the receiving and the transmitting can occur on different links of AP MLD 110. For example, the receiving of the group address, and the GCR primary link or the GCR primary link set can be from the first member via any link of AP MLD 110, and the transmitting the group address, a concealment address, the GCR primary link or the GCR primary link set, and the AID that corresponds to the group address, to the first member can be via any link of AP MLD 110. Subsequently, AP MLD 110 can transmit a GCR frame corresponding to the group address via the GCR primary link or the GCR primary link set.

At 1450, AP MLD 110 can transmit a solicited or unsolicited GCR update signal that includes: an updated delivery time, an updated concealment address, an updated GCR primary link or an updated GCR primary link set, and/or an updated $AID_{\_GCR}$. This update can occur any time after the establishment of a GCR agreement 1445.

At 1455, AP MLD 110 can begin GCR frame delivery. Some functions of GCR frame delivery are described in 1460, 1465, 1470, 1480, 1485, and 1490.

At 1460, AP MLD 110 utilizes the GCR primary link or the GCR primary link set to transmit a GCR frame during a GCR frame delivery time. When the group address corresponds to a GCR-MLO group where all members are available on a common link during a GCR frame delivery time, AP MLD 110 can utilize the common link as the GCR primary link during the GCR frame delivery time. The GCR frame delivery time can be based at least on: a non-GCR-SP or a GCR-SP. When the GCR frame delivery time is based on the non-GCR-SP, the GCR frame delivery time occurs after a delivery traffic indication message (DTIM) beacon and after a No-Ack/No-Retry group addressed frame delivery.

When the group address corresponds to a GCR-MLO group where members are not all available on a common link during a GCR frame delivery time, AP MLD 110 can utilize a GCR primary link set where each of the members is available on at least one link within the GCR primary link set during the GCR frame delivery time.

At 1465, AP MLD 110 can transmit an aggregate-Medium Access Control (MAC) Protocol Data Unit (A-MPDU) including an aggregated payload with aggregated GCR frames that share a common traffic identifier (TID). For example, AP MLD 110 can determine that members of the GCR-MLO group are GCR-capable stations, and then transmit the A-MPDU that includes an aggregated payload with aggregated GCR frames that share a common TID. In some embodiments, AP MLD 110 can determine that members of the GCR-MLO group are capable of receiving aggregated GCR frames, and transmit an A-MPDU the includes an aggregated payload with aggregated GCR frames corresponding to two or more TIDs.

At 1470, AP MLD 110 can implement: an unsolicited retry GCR-MLO retransmission policy, or a block acknowledgement (BA) GCR-MLO retransmission policy. For example, AP MLD 110 can determine a maximum number of retries of a GCR frame corresponding to the group address; and transmit the GCR frame according to the maximum number of retries. In some embodiments, AP MLD 110 can implement a block acknowledgement (BA) GCR-MLO retransmission policy. Accordingly, AP MLD 110 can determine that a first non-AP MLD 110 operates on more than one link of the GCR primary link set, determine a nominal link of the GCR primary link set on which to receive a GCR BA request (BAR), and transmit to the first non-AP MLD 110, via the transceiver, the nominal link.

At 1480, AP MLD 110 can provide indications to a non-AP MLD to end a GCR-SP sooner than the scheduled duration of the GCR-SP. Thus, the non-AP MLD can return to a power save mode before the scheduled duration of the GCR-SP. For example, AP MLD 110 can transmit on one link of the GCR primary link set, a first GCR-SP corresponding to the group address, and transmit an indication ending the first GCR-SP before a scheduled duration of the first GCR-SP ends. In some embodiments, the indication includes but is not limited to: a Cascade Indication=0 in a first trigger frame, or the first trigger frame is not targeted to a member of the GCR-MLO group; a More Trigger Frame (TF)=0 in a second trigger frame for stations that did not have a resource unit (RU) allocated by the second trigger frame; a Quality of Service (QoS) Null frame; an end of SP (EOSP)=1; More Data (MD)=0 in a GCR frame; and/or a GCR-SP termination indication.

At 1485, AP MLD 110 can manage GCR-SPs that overlap with other SPs. For example, AP MLD 110 can transmit on the one link of the GCR primary link set, a TWT SP for an individually addressed frame that overlaps with the first GCR-SP corresponding to the group address. Subsequently, AP MLD 110 can transmit an indication ending the first GCR-SP before a maximum duration of the first GCR-SP, but not affecting the TWT SP.

In some examples, AP MLD 110 can transmit an indication that ends one GCR-SP but not another overlapping GCR-SP. For example, AP MLD 110 can transmit on one link of the GCR primary link set, a TWT SP for an individually addressed frame that overlaps with the first GCR-SP corresponding to the group address, and a second GCR-SP. Subsequently, AP MLD 110 can transmit, an indication ending the first GCR-SP before a maximum duration of the first GCR-SP, but not affecting the second GCR-SP.

At 1490, AP MLD 110 can terminate one or more GCR-SPs and one or more TWT SPs using a trigger frame (TF) with More TF=0. For example, AP MLD 110 can transmit a trigger frame comprising More TF=0, terminating the first GCR-SP, the second GCR-SP, and the TWT SP, for stations that did not have a resource unit (RU) allocated by the trigger frame.

Figure 15:
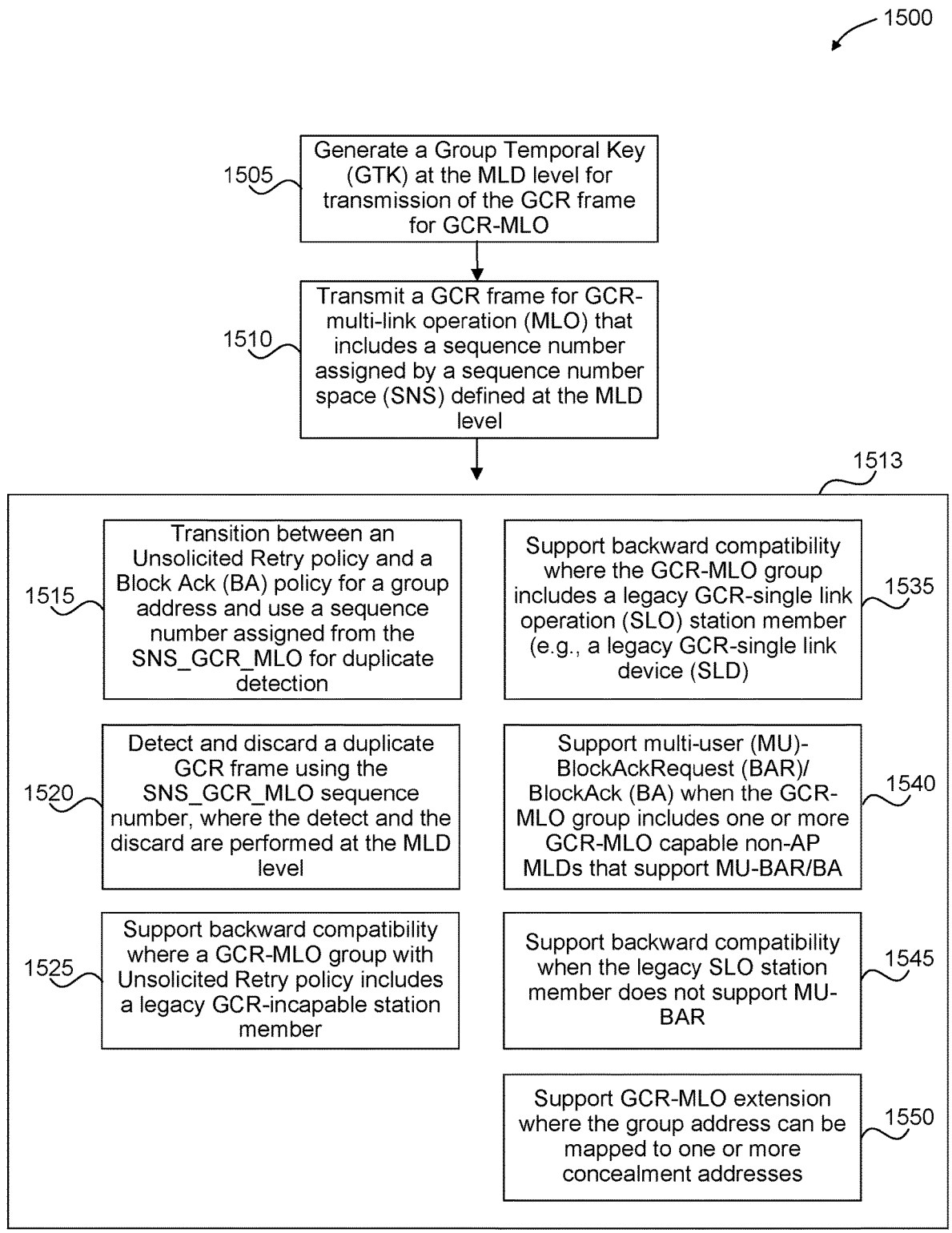
FIG. 15 illustrates another example method for an AP MLD for GCR-MLO, according to some embodiments of the disclosure.

FIG. 15 illustrates another example method 1500 for an AP MLD for GCR-MLO, according to some embodiments of the disclosure. As a convenience and not a limitation, method 1500, can be described with reference to elements of other figures in the disclosure. For example, method 1500 can be performed by AP MLD 110 of FIG. 1, or processor(s) 265 of system 200 of FIG. 2 that executes instructions stored in memory 285.

At 1505, AP MLD 110 can generate a Group Temporal Key (GTK) at the MLD level for transmission of the GCR frame for GCR-MLO. For example AP MLD 110 can generate a GTK_GCR_ML at the MLD level, wherein the GTK_GCR_ML is used for encryption and decryption of the GCR frame. In some embodiments, to generate the GTK_GCR_ML at the MLD level, AP MLD 110 is further configured to: utilize a MAC address of the AP MLD as the Authenticator Address (AA). In some embodiments, AP MLD 110 can use the GTK_GCR_ML for encryption and decryption of the GCR frame for all links of AP MLD 110. In some embodiments, AP MLD 110 can use a truncated version of the GTK_GCR_ML for encryption and decryption of the group addressed frames that are not subject to a GCR agreement for a link of AP MLD 110.

At 1510, AP MLD 110 can transmit a GCR frame for GCR-multi-link operation (MLO) that includes a sequence number assigned from a sequence number space (SNS) defined at the MLD level. For example, AP MLD 110 can transmit a GCR frame subject to a GCR-MLO agreement comprising a sequence number assigned from SNS_GCR_MLO where SNS_GCR_MLO is defined at a MLD level. In some embodiments the SNS_GCR_MLO can correspond to: a SNS_GCR_MLO_Unsolicited Retry that allows multiplicity, and is indexed by an address; or a SNS_GCR_MLO_BlockAck that allows multiplicity, and is indexed by an address and a traffic identifier (TID).

At 1513, some functions regarding GCR_MLO operations are described in 1515, 1520, 1525, 1535, 1540, and/or 1545 in any order.

At 1515, AP MLD 110 can transition between an Unsolicited Retry policy and a Block Ack (BA) policy for a group address, and use a sequence number assigned from SNS_GCR_MLO for duplicate detection. During the transition, AP MLD 110 can transmit via the transceiver, a last SNS_GCR_MLO sequence number corresponding to the group address, delivered prior to the transition.

At 1520, AP MLD 110 can detect and discard a duplicate GCR frame using the SNS_GCR_MLO sequence number, where the detecting and the discarding are performed at the MLD level.

At 1525, AP MLD 110 supports backward compatibility where a GCR-MLO group includes a legacy GCR-incapable station member. For example, when the GCR frame corresponds to a GCR-MLO group including a legacy GCR-incapable station member, AP MLD 110 can utilize a SNS_GCR_MLO_Unsolicited Retry, use sequence number assigned from the SNS_GCR_MLO, and transmit a No-Ack/No-Retry group addressed frame corresponding to the GCR-MLO group on all links of AP MLD 110.

In some embodiments, AP MLD 110 can establish the GCR-MLO agreement comprising a GCR primary link on which members of the GCR-MLO group commit to be available to receive the GCR frame, where the initial GCR frame is transmitted via the primary link. Further, AP MLD 110 can assign a number of retry times for the GCR frame. In some embodiments, AP MLD 110 can establish the GCR-MLO agreement including a GCR primary link set on which members of the GCR-MLO group commit to be available to receive the GCR frame on a link of the GCR primary link set, where the initial GCR frame is transmitted via the links of the GCR primary link set. AP MLD 110 can assign a number of retry times for the GCR frame.

At 1535, AP MLD 110 supports backward compatibility where the GCR-MLO group includes a legacy GCR-single link operation (SLO) station member (e.g., a legacy GCR-single link device (SLD).) In some embodiments, AP MLD 110 can utilize a SNS_GCR_MLO_Unsolicited Retry, and use sequence number assigned from SNS_GCR_MLO for duplicate detection, where the initial GCR frame is transmitted via the GCR primary link or links of the GCR primary link set. In some embodiments, AP MLD 110 can utilize a SNS_GCR_MLO_BlockAck corresponding to the SNS_GCR_MLO sequence number, where the GCR frame is transmitted via the GCR primary link or links of the GCR primary link set. In some embodiments, AP MLD 110 can retransmit, via the transceiver, the GCR frame, based at least on: a BlockAck from members of the GCR-MLO group; a missing BlockAck frame; or availability of a member of the GCR-MLO group on a link of the GCR primary link or the GCR primary link set.

At 1540, AP MLD 110 supports multi-user (MU)-BlockAckRequest (BAR)/BlockAck (BA) when the GCR-MLO group includes one or more GCR-MLO capable non-AP MLDs that support MU-BAR/BA. For example, AP MLD 110 can initiate a block negotiation with the one or more GCR-MLO capable non-AP MLDs that support MU-BAR/BA, and subsequent to transmitting the GCR frame, transmit a MU-BAR to request BA for one or more (e.g. multiple) TIDs.

At 1545, AP MLD 110 includes backward compatibility when the legacy SLO station member does not support MU-BAR. For example, AP MLD 110 can initiate a block negotiation with the legacy SLO station member. Subsequent to transmitting the GCR frame, transmit a BAR to request BA from the legacy SLO station member.

At 1550, AP MLD 110 can support GCR-MLO extension where the group address can be mapped to one or more concealment addresses. For example, AP MLD 110 can determine that all members of the GCR-MLO group support GCR-MLO. Based at least on the determination, AP MLD 110 can map a group address of the GCR-MLO group to one or more concealment addresses that correspond to respective one or more GCR sub-groups. In some embodiments, the respective one or more GCR sub-groups are identified by respective GCR IDs, wherein the respective GCR IDs correspond respective GTK_GCR-MLs that are different than the GTK_GCR_ML. In some embodiments, AP MLD 110 can detect and discard a duplicate concealment address of the one or more concealment addresses, wherein the detect and the discard are performed at the MLD level.

Figure 16:
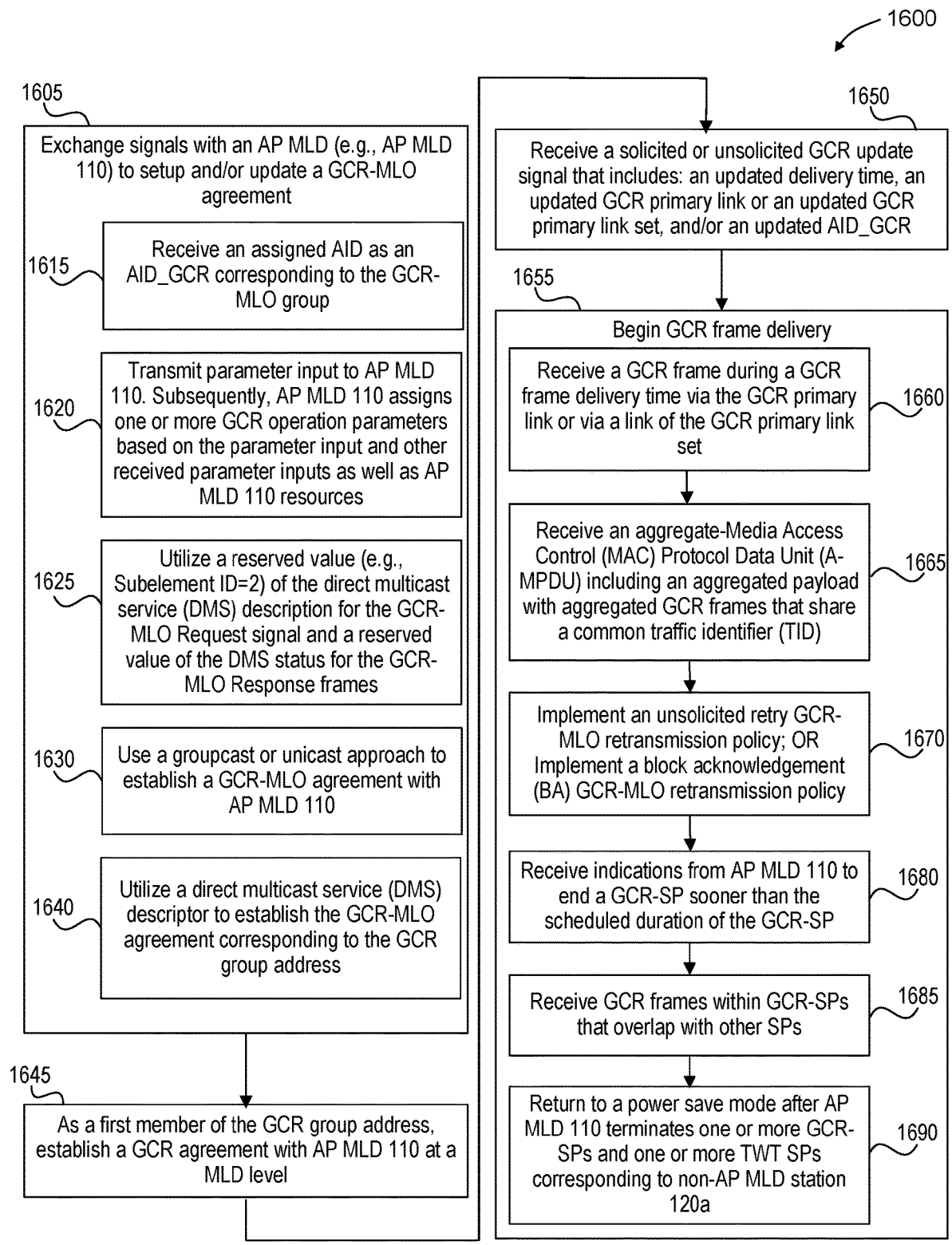
FIG. 16 illustrates an example method for a non-AP MLD for GCR-MLO, according to some embodiments of the disclosure.

FIG. 16 illustrates an example method 1600 for a non-AP MLD for GCR-MLO service, according to some embodiments of the disclosure. As a convenience and not a limitation, method 1600, can be described with reference to elements of other figures in the disclosure. For example, method 1600 can be performed by a non-AP MLD 120 (e.g., 120a-120c) of FIG. 1, or processor(s) 265 of system 200 of FIG. 2 that executes instructions stored in memory 285. Some functions of signals exchanged are described in 1615, 1620, 1625, 1630, and 1640, and the order of the functions may vary. At 1605, non-AP MLD station (e.g., non-AP MLD station 120a) exchanges signals with an AP MLD (e.g., AP MLD 110) to setup and/or update a GCR-MLO agreement.

At 1615, non-AP MLD station 120a can receive an assigned AID as an $AID_{GCR}$ corresponding to the GCR-MLO group. AP MLD 110 can allocate a resource unit (RU) according to the $AID_{GCR}$ corresponding to a GCR frame of the group address. In some embodiments, the AID is common among all GCR groups.

At 1620, non-AP MLD station 120a can transmit parameter input to AP MLD 110 (e.g., a request for certain parameters to be set at a value). Subsequently, AP MLD 110 assigns one or more GCR operation parameters based on the parameter input and other received parameter inputs as well as AP MLD 110 resources. For example, AP MLD 110 can receive from non-AP MLD station 120a, a first member of the GCR-MLO group, a first parameter in a GCR-MLO Request signal, and based at least on the first parameter and input from another member of the GCR-MLO group corresponding to the group address, AP MLD 110 can assign a GCR operation parameter that is different than the first parameter. Non-AP MLD station 120a can receive the GCR operation parameter in a GCR-MLO Response signal from AP MLD 110.

At 1625, non-AP MLD station 120a can contain a GCR-MLO parameters including the group address, and preferred GCR primary link or the GCR primary link set, in an subelement of the DMS Descriptor where the subelement ID uses a reserved value (e.g., subelement ID=2) in REVme_D0.

At 1630, non-AP MLD station 120a can use a groupcast or unicast approach to establish a GCR-MLO agreement with AP MLD 110. For example, non-AP MLD station 120a can receive a broadcast frame, groupcast frame or unicast frame that is used to establish an SP for delivery of GCR frames subject to a GCR-MLO agreement. In some embodiments, the broadcast SP includes a broadcast TWT SP that includes the group address corresponding to the GCR-MLO group, a concealment address, and/or an identifier of the GCR-MLO group (e.g., a GCR-MLO group ID) corresponding to the GCR-MLO agreement. When the GCR-SP enables low latency service, a restrictive TWT SP can be modified by AP MLD 110 for GCR-MLO SP establishment. In some embodiments, the SP established using broadcast frames includes a broadcast target wake time (TWT) element that can include the group address corresponding to the GCR-MLO group, the corresponding concealment address, and/or an identifier of the GCR-MLO group (e.g., a GCR-MLO group ID) corresponding to the GCR-MLO agreement. When the GCR-SP is used for low latency service, a non-AP MLD can receive such modified broadcast target wake time (TWT) element.

At 1640, non-AP MLD station 120a can utilize a DMS descriptor to establish the GCR-MLO agreement corresponding to the group address. For example, non-AP MLD 120a can contain GCR-MLO parameters including the group address, and the preferred GCR primary link or the GCR primary link set, in an subelement of the DMS Descriptor where the subelement ID uses a reserved value (e.g., subelement ID=2) in REVme_D0.0.

At 1645, non-AP MLD station 120a can be a first member of the GCR-MLO group and can establish a GCR-MLO agreement with AP MLD 110 at a MLD level. During establishment of the GCR-MLO agreement, the receiving and the transmitting can occur on different links of non-AP MLD station 120a. For example, the transmitting of the group address, and the GCR primary link or the GCR primary link set can be via any link of non-AP MLD station 120a, and the receiving of the group address, the corresponding concealment address, the GCR primary link or the GCR primary link set, and the AID that corresponds to the group address, by non-AP MLD station 120a can be via any link of non-AP MLD station 120a. Subsequently, non-AP MLD station 120a can receive a GCR frame corresponding to the group address via the GCR primary link or the GCR primary link set.

At 1650, non-AP MLD station 120a can receive a solicited or unsolicited GCR update signal that includes: an updated delivery time, an updated GCR primary link or an updated GCR primary link set, and/or an updated $AID_{GCR}$. This update can occur at any time after the establishment of a GCR agreement.

At 1655, non-AP MLD station 120 can begin receiving GCR frames. Some functions of GCR frame reception are described in 1660, 1665, 1670, 1680, 1685, and 1690.

At 1660, non-AP MLD station 120a receives a GCR frame during a GCR frame delivery time via the GCR primary link or via a link of the GCR primary link set. The GCR frame delivery time can be based at least on: a non-GCR-SP or a GCR-SP. When the GCR frame delivery time is based on the non-GCR-SP, the GCR frame delivery time occurs after a DTIM beacon and after a No-Ack/No-Retry group addressed frame delivery.

At 1665, non-AP MLD station 120a can receive an A-MPDU including an aggregated payload with aggregated GCR frames that share a common traffic identifier (TID). In some embodiments, non-AP MLD station 120a can receive an A-MPDU that includes an aggregated payload with aggregated GCR frames corresponding to two or more TIDs.

At 1670, non-AP MLD station 120a can implement: an unsolicited retry GCR-MLO retransmission policy, or a block acknowledgement (BA) GCR-MLO retransmission policy. For example, AP MLD 110 can determine a maximum number of retries of a GCR frame corresponding to the group address; and non-AP MLD station 120a can receive the GCR frame according to the maximum number of retries. In some embodiments, non-AP MLD station 120a can implement a block acknowledgement (BA) GCR-MLO retransmission policy. Accordingly, AP MLD 110 can determine that a first non-AP MLD 110 operates on more than one link of the GCR primary link set, determine a nominal link of the GCR primary link set on which to receive a GCR BA request (BAR), and non-AP MLD station 120a can receive a BAR via the nominal link from AP MLD 110.

At 1680, non-AP MLD station 120a can receive indications from AP MLD 110 to end a GCR-SP sooner than the scheduled duration of the GCR-SP. Thus, non-AP MLD 120a can return to a power save mode before the scheduled duration of the GCR-SP. For example, non-AP MLD station 120a can receive on one link of the GCR primary link set, a first GCR-SP corresponding to the group address, and receive an indication ending the first GCR-SP before a scheduled duration of the first GCR-SP ends. In some embodiments, the indication received includes but is not limited to: a Cascade Indication=0 in a first trigger frame, or the first trigger frame is not targeted to a member of the GCR-MLO group; a More Trigger Frame (TF)=0 in a second trigger frame and non-AP MLD station 120a did not have a resource unit (RU) allocated by the second trigger frame; a Quality of Service (QoS) Null frame; an end of SP (EOSP)=1; More Data (MD)=0 in a GCR frame; and/or a GCR-SP termination indication.

At 1685, non-AP MLD station 120a can receive GCR frames within GCR-SPs that overlap with other SPs. For example, AP MLD 110 can transmit on the one link of the GCR primary link set, a TWT SP for an individually addressed frame that overlaps with the first GCR-SP corresponding to the group address. Subsequently, AP MLD 110 can transmit an indication ending the first GCR-SP before a maximum duration of the first GCR-SP, but not affecting the TWT SP.

In some examples, non-AP MLD station 120a can receive an indication from AP MLD 110 that ends one GCR-SP but not another overlapping GCR-SP. For example, non-AP MLD station 120a can receive from AP MLD 110, on one link of the GCR primary link set, a TWT SP for an individually addressed frame that overlaps with the first GCR-SP corresponding to the group address, and a second GCR-SP. Subsequently, non-AP MLD station 120a can receive from AP MLD 110, an indication ending the first GCR-SP before a maximum duration of the first GCR-SP, but not affecting the second GCR-SP.

At 1690, non-AP MLD station 120a can return to a power save mode after AP MLD 110 terminates one or more GCR-SPs and one or more TWT SPs corresponding to non-AP MLD station 120a. For example, AP MLD 110 can transmit a trigger frame (TF) with More TF=0, terminating the first GCR-SP, the second GCR-SP, and the TWT SP, for non-AP MLD station 120a that did not have a resource unit (RU) allocated by the trigger frame.

Figure 17:
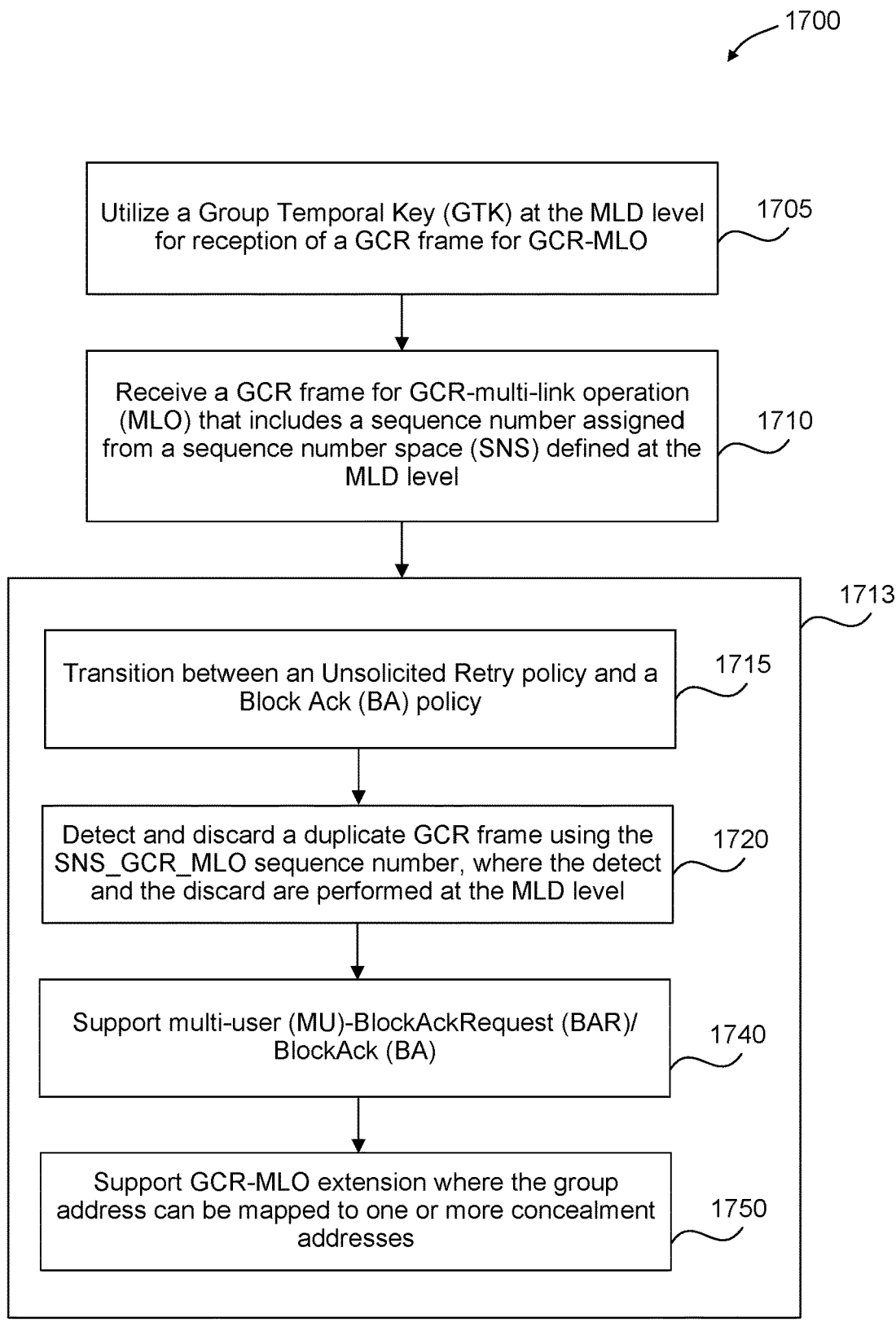
FIG. 17 illustrates another example method for a non-AP MLD for GCR-MLO, according to some embodiments of the disclosure.

FIG. 17 illustrates another example method 1700 for a non-AP MLD station (e.g., non-AP MLD station 120a) for GCR-MLO, according to some embodiments of the disclosure. As a convenience and not a limitation, method 1700, can be described with reference to elements of other figures in the disclosure. For example, method 1700 can be performed by non-AP MLD station 120a of FIG. 1, or processor(s) 265 of system 200 of FIG. 2 that executes instructions stored in memory 285.

At 1705, non-AP MLD station 120a can receive a GCR frame for GCR-multi-link operation (MLO) that includes a sequence number assigned by a sequence number space (SNS) defined at the MLD level. For example, non-AP MLD station 120a can receive a GCR frame subject to a GCR-MLO agreement comprising a SNS_GCR_MLO sequence number assigned at a MLD level. In some embodiments the SNS_GCR_MLO can correspond to: a SNS_GCR_MLO_Unsolicited Retry that allows multiplicity, and is indexed by an address (e.g., the group address corresponding to the GCR-MLO group); or a SNS_GCR_MLO Block-Ack that allows multiplicity, and is indexed by an address and a traffic identifier (TID).

At 1710, non-AP MLD station 120a can utilize a Group Temporal Key (GTK) generated at the MLD level for the reception of a GCR frame. For example AP MLD 110 can generate a GTK_GCR_ML at the MLD level, wherein the GTK_GCR_ML is used for encryption and decryption of the GCR frame. In some embodiments, non-AP MLD station 120a can use the GTK_GCR_ML for encryption and decryption of the group addressed frames that are not subject to a GCR agreement for all links of non-AP MLD station 120a. In some embodiments, non-AP MLD station 120a can use a truncated version of the GTK_GCR_ML for encryption and decryption of the group addressed frames that are not subject to a GCR agreement for a link of non-AP MLD station 120a.

At 1713, some functions regarding GCR_MLO operations are described in 1715, 1720, 1525, and/or 1740 in any order.

At 1715, non-AP MLD station 120a can transition between an Unsolicited Retry policy and a Block Ack (BA) policy. For example, AP MLD 110 can transition between an Unsolicited Retry policy and a BA policy for a group address. During the transition, non-AP MLD station 120a can receive from AP MLD 110, a last SNS_GCR_MLO sequence number corresponding to the group address, delivered prior to the transition.

At 1720, non-AP MLD station 120*a* can detect and discard a duplicate GCR frame using a sequence number assigned by the SNS_GCR_MLO defined at the MLD level, where the detect and the discard are performed at the MLD level.

At 1740, non-AP MLD station 120*a* can support multi-user (MU)-BlockAckRequest (BAR)/BlockAck (BA). For example, AP MLD 110 can initiate a block negotiation with the non-AP MLD station 120*a*. Subsequent to receiving the GCR frame from AP MLD 110, non-AP MLD station 120*a* can receive a MU-BAR to transmit BA for one or more (e.g. multiple) TIDs.

At 1750, non-AP MLD station 120*a* can support GCR-MLO extension where the group address can be mapped to one or more concealment addresses. For example, AP MLD 110 can determine that all members of the GCR-MLO group support GCR-MLO. Based at least on the determination, AP MLD 110 can map a group address of the GCR-MLO group to one or more concealment addresses that correspond to respective one or more GCR sub-groups. In some embodiments, the respective one or more GCR sub-groups are identified by respective GCR IDs, wherein the respective GCR IDs correspond respective GTK_GCR-MLs that are different than the GTK_GCR_ML. In some embodiments, non-AP MLD station 120*a* can detect and discard a duplicate concealment address of the one or more concealment addresses, where the detecting and the discarding are performed at the MLD level.

Figure 18:
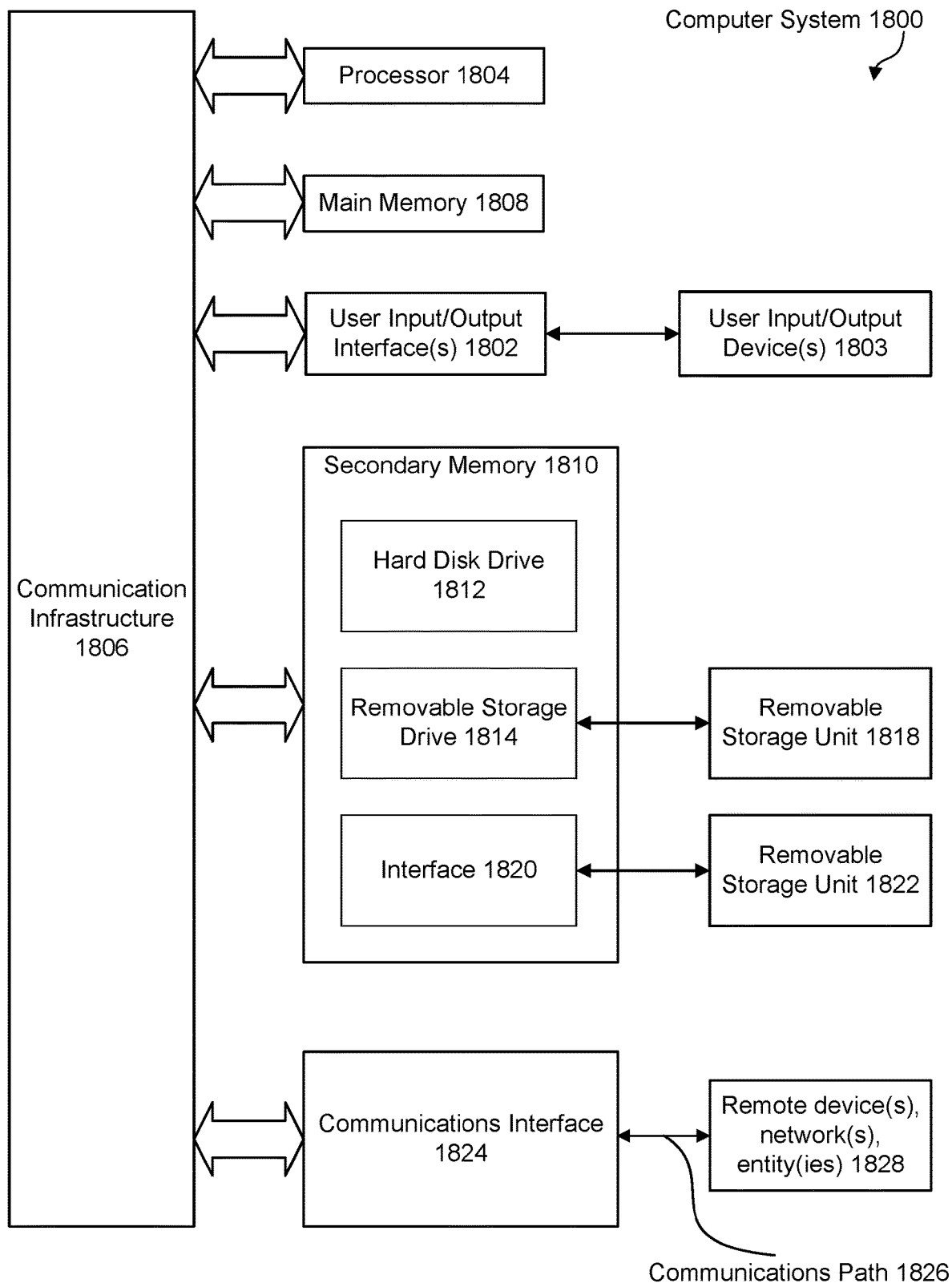
FIG. 18 is an example computer system for implementing some embodiments or portion(s) thereof.

Various embodiments can be implemented, for example, using one or more well-known computer systems, such as computer system 1800 shown in FIG. 18. Computer system 1800 can be any well-known computer capable of performing the functions described herein. For example, and without limitation, system 200 of FIG. 2, method 1400 of FIG. 14, method 1500 of FIG. 15, method 1600 of FIG. 16, method 1700 of FIG. 17 (and/or other apparatuses and/or components shown in the figures) may be implemented using computer system 1800, or portions thereof.

Computer system 1800 includes one or more processors (also called central processing units, or CPUs), such as a processor 1804. Processor 1804 is connected to a communication infrastructure 1806 that can be a bus. One or more processors 1804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1800 also includes user input/output device(s) 1803, such as monitors, keyboards, pointing devices, etc., that communicate with communication infrastructure 1806 through user input/output interface(s) 1802. Computer system 1800 also includes a main or primary memory 1808, such as random access memory (RAM). Main memory 1808 may include one or more levels of cache. Main memory 1808 has stored therein control logic (e.g., computer software) and/or data.

Computer system 1800 may also include one or more secondary storage devices or memory 1810. Secondary memory 1810 may include, for example, a hard disk drive 1812 and/or a removable storage device or drive 1814. Removable storage drive 1814 may be a floppy disk drive, a magnetic tape drive, a compact disk drive, an optical storage device, tape backup device, and/or any other storage device/drive.

Removable storage drive 1814 may interact with a removable storage unit 1818. Removable storage unit 1818 includes a computer usable or readable storage device having stored thereon computer software (control logic) and/or data. Removable storage unit 1818 may be a floppy disk, magnetic tape, compact disk, DVD, optical storage disk, and/any other computer data storage device. Removable storage drive 1814 reads from and/or writes to removable storage unit 1818 in a well-known manner.

According to some embodiments, secondary memory 1810 may include other means, instrumentalities or other approaches for allowing computer programs and/or other instructions and/or data to be accessed by computer system 1800. Such means, instrumentalities or other approaches may include, for example, a removable storage unit 1822 and an interface 1820. Examples of the removable storage unit 1822 and the interface 1820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1800 may further include a communication or network interface 1824. Communication interface 1824 enables computer system 1800 to communicate and interact with any combination of remote devices, remote networks, remote entities, etc. (individually and collectively referenced by reference number 1828). For example, communication interface 1824 may allow computer system 1800 to communicate with remote devices 1828 over communications path 1826, which may be wired and/or wireless, and which may include any combination of LANs, WANs, the Internet, etc. Control logic and/or data may be transmitted to and from computer system 1800 via communication path 1826.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1800, main memory 1808, secondary memory 1810 and removable storage units 1818 and 1822, as well as tangible articles of manufacture embodying any combination of the foregoing. Such control logic, when executed by one or more data processing devices (such as computer system 1800), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 18. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. An access point (AP) multi-link device (MLD), comprising:
   a transceiver; and
   a processor communicatively coupled to the transceiver, configured to:
      generate a Group Temporal Key (GTK)_Group Cast with Retries (GCR)_Multi-link (ML) at a MLD level for transmission of a GCR frame, wherein the GCR frame includes a group address subject to a GCR-multi-link operation (MLO) agreement;
      encrypt the GCR frame using the GTK_GCR_ML; and
      transmit, via the transceiver, the encrypted GCR frame.

2. The AP MLD of claim 1, wherein the GCR frame comprises a sequence number assigned from a sequence number space (SNS)_GCR_MLO defined at the MLD level.

3. The AP MLD of claim 2, wherein the processor is further configured to:
   transition between an Unsolicited Retry policy and a Block Ack (BA) policy for the group address.

4. The AP MLD of claim 2, wherein the GCR frame corresponds to a GCR-MLO group comprising a legacy GCR-incapable station member, the processor is further configured to:
   transmit, via the transceiver, a group addressed frame corresponding to the GCR-MLO group on all links of the AP MLD using a No-Ack/No-Retry group addressed frame format, wherein the group addressed frame using the No-Ack/No-Retry group addressed frame format includes the sequence number at the MLD level.

5. The AP MLD of claim 1, wherein the processor is further configured to:
   use the GTK_GCR_ML for encryption of the GCR frame for all links of the AP MLD.

6. The AP MLD of claim 1, wherein the processor is further configured to:
   use a truncated version of the GTK_GCR_ML for encryption and decryption of a group addressed frame that is not subject to a GCR agreement for a link of the AP MLD.

7. The AP MLD of claim 1, wherein the processor is further configured to:
   establish the GCR-MLO agreement comprising a GCR primary link on which members of a GCR-MLO group commit to be available to receive the GCR frame, wherein an initial GCR frame is transmitted via the GCR primary link; and
   determine a maximum number of retry times for the GCR frame.

8. The AP MLD of claim 1, wherein the processor is further configured to:
   establish the GCR-MLO agreement comprising a GCR primary link set on which members of a GCR-MLO group commit to be available to receive the GCR frame on a link of the GCR primary link set, wherein an initial GCR frame is transmitted via links of the GCR primary link set; and determine a maximum number of retry times for the GCR frame.

9. A non-transitory computer-readable medium storing instructions that, when executed by a processor of a first electronic device, cause the first electronic device to perform operations for an Access Point (AP) multi-link device (MLD), the operations comprising:

generating a Group Temporal Key (GTK)_Group Cast with Retries (GCR) Multi-link (ML) at a MLD level for transmission of a GCR frame, wherein the GCR frame includes a group address subject to a GCR-multi-link operation (MLO) agreement;

encrypting the GCR frame using the GTK_GCR ML; and transmitting, the encrypted GCR frame.

10. The non-transitory computer-readable medium of claim 9, wherein the GCR frame comprises a sequence number assigned from a sequence number space (SNS) _GCR_MLO defined at the MLD level.

11. The non-transitory computer-readable medium of claim 9, wherein the GCR frame corresponds to a GCR-MLO group comprising one or more GCR-MLO capable non-AP MLDs that support multi-user (MU) BlockAckRequest (BAR)/BlockAck (BA), the operations further comprise:

initiating a block negotiation with the one or more GCR-MLO capable non-AP MLDs that support MU-BAR/BA; and subsequent to transmitting the GCR frame, transmitting a MU-BAR to request BA for multiple traffic identifiers (TIDs).

12. The non-transitory computer-readable medium of claim 11, wherein a legacy GCR-single link operation (SLO) station member of the GCR-MLO group does not support the MU-BAR, the operations further comprise:

initiating the block negotiation with the legacy SLO station member; and subsequent to transmitting the GCR frame, transmitting a BAR to request BA from the legacy SLO station member.

13. The non-transitory computer-readable medium of claim 11, wherein the operations further comprise:

retransmitting the GCR frame based at least on: a Block-Ack from members of the GCR-MLO group; a missing BlockAck frame; or an availability of a member of the GCR-MLO group on a link of a GCR primary link or a GCR primary link set, or other links.

14. A method for an access point (AP) multi-link device (MLD), comprising:

generating a Group Temporal Key (GTK)_Group Cast with Retries (GCR)_Multi-link (ML) at a MLD level for transmission of a GCR frame, wherein the GCR frame includes a group address subject to a GCR-multi-link operation (MLO) agreement;

encrypting the GCR frame using the GTK_GCR ML; and transmitting the encrypted GCR frame.

15. The method of claim 14, wherein the GCR frame comprises a sequence number assigned from a sequence number space (SNS)_GCR_MLO defined at the MLD level.

16. The method of claim 15, further comprising transitioning between an Unsolicited Retry policy and a Block Ack (BA) policy for the group address.

17. The method of claim 15, wherein the GCR frame corresponds to a GCR-MLO group comprising a legacy GCR-incapable station member, the method further comprises transmitting a group addressed frame corresponding to the GCR-MLO group on all links of the AP MLD using a No-Ack/No-Retry group addressed frame format, wherein the group addressed frame using the No-Ack/No-Retry group addressed frame format includes the sequence number at the MLD level.

18. The method of claim 14, further comprising using the GTK_GCR ML for encryption of the GCR frame for all links of the AP MLD.

19. The method of claim 14, further comprising using a truncated version of the GTK_GCR_ML for encryption and decryption of a group addressed frame that is not subject to a GCR agreement for a link of the AP MLD.

20. The method of claim 14, further comprising:

establishing the GCR-MLO agreement comprising a GCR primary link set on which members of a GCR-MLO group commit to be available to receive the GCR frame on a link of the GCR primary link set, wherein an initial GCR frame is transmitted via links of the GCR primary link set; and determining a maximum number of retry times for the GCR frame.

* * * * *